US008483134B2

(12) United States Patent
Iwai et al.

(10) Patent No.: US 8,483,134 B2
(45) Date of Patent: Jul. 9, 2013

(54) RADIO TRANSMISSION APPRATUS AND RADIO TRANSMISSION METHOD THAT SWITCH BETWEEN COMMUNICATION METHODS

(75) Inventors: Takashi Iwai, Ishikawa (JP); Katsuhiko Hiramatsu, Kanagawa (JP); Daichi Imamura, Kanagawa (JP); Akihiko Nishio, Kanagawa (JP); Seigo Nakao, Kanagawa (JP); Atsushi Sumasu, Kanagawa (JP); Yoshihiko Ogawa, Kanagawa (JP); Sadaki Futagi, Ishikawa (JP)

(73) Assignee: Panasonic Corporation, Osaka (JP)

( * ) Notice: Subject to any disclaimer, the term of this patent is extended or adjusted under 35 U.S.C. 154(b) by 288 days.

(21) Appl. No.: 12/989,694

(22) PCT Filed: Jun. 16, 2009

(86) PCT No.: PCT/JP2009/002741
§ 371 (c)(1),
(2), (4) Date: Oct. 26, 2010

(87) PCT Pub. No.: WO2009/153978
PCT Pub. Date: Dec. 23, 2009

(65) Prior Publication Data
US 2011/0205966 A1    Aug. 25, 2011

(30) Foreign Application Priority Data

Jun. 17, 2008 (JP) .................................. 2008-158017
Sep. 11, 2008 (JP) .................................. 2008-233710

(51) Int. Cl.
*H04W 4/00* (2009.01)
(52) U.S. Cl.
USPC ....................................................... 370/328

(58) Field of Classification Search
USPC .............. 370/310.2, 328, 331, 338, 310, 311, 370/332, 333, 431, 465, 252, 310.1
See application file for complete search history.

(56) References Cited

U.S. PATENT DOCUMENTS 7,684,463 B2 * 3/2010 Kawasaki ..................... 375/130
(Continued)

FOREIGN PATENT DOCUMENTS

JP    2008-193439    8/2008
JP    2008-219212    9/2008

OTHER PUBLICATIONS

Panasonic. "Technical proposals and considerations for LTE advanced". 3GPP TSG RAN IMT Advanced Workshop, REV-080007, Apr. 7-8, 2008.
Nokia Siemens Networks, etc., "Triggers for Power Headroom Reports in EUTRAN Uplink". 3GPP TSG WG1 Meeting #52bis, R1-081464 , Mar. 31-Apr. 4, 2008.

*Primary Examiner* — Kwang B Yao
*Assistant Examiner* — Anh Ngoc Nguyen
(74) *Attorney, Agent, or Firm* — Greenblum & Bernstein, P.L.C.

(57) ABSTRACT

A radio transmission apparatus and a radio transmission method suppress lowering of the throughput caused by switching between the single carrier communication method and the multi-carrier communication method while suppressing increase in the signaling amount. A PHR threshold value setter sets a threshold value at a position greater by a predetermined value than the PHR at which the throughput performance of the SC-FDMA coincides with that of the OFDMA. A trigger signal transmission judger judges that a mobile station transmits a trigger signal for switching from the OFDMA to the SC-FDMA if the PHR in the OFDMA communication method is lower than the threshold value.

14 Claims, 19 Drawing Sheets

U.S. PATENT DOCUMENTS

| | | | |
|---|---|---|---|
| 7,746,840 B2 * | 6/2010 | Lee | 370/348 |
| 8,081,698 B2 * | 12/2011 | Xu et al. | 375/267 |
| 8,218,521 B2 * | 7/2012 | Koyanagi | 370/344 |
| 2004/0252658 A1 * | 12/2004 | Hosein et al. | 370/328 |
| 2008/0037413 A1 * | 2/2008 | Gu et al. | 370/210 |
| 2008/0207143 A1 * | 8/2008 | Skarby et al. | 455/103 |

OTHER PUBLICATIONS

Ericsson, etc., "Uplink Scheduling Information in E-UTRAN", 3GPP TSG-RAN WG2 Meeting #60, R2-074682, Nov. 5-9, 2007.

NEC, "Proposals on PHY related aspects in LTE Advanced", 3GGP TSG RAN1#53. R1-081752, May 5-9, 2008.

* cited by examiner

| PMI#1 | PMI#2 | PMI#3 |
|---|---|---|
| $\frac{1}{\sqrt{2}}\begin{bmatrix} 1 & 0 \\ 0 & 1 \end{bmatrix}$ | $\frac{1}{2}\begin{bmatrix} 1 & 1 \\ 1 & -1 \end{bmatrix}$ | $\frac{1}{2}\begin{bmatrix} 1 & 1 \\ j & -j \end{bmatrix}$ |

FIG.14

RADIO TRANSMISSION APPRATUS AND RADIO TRANSMISSION METHOD THAT SWITCH BETWEEN COMMUNICATION METHODS

TECHNICAL FIELD

The present invention relates to a radio transmission apparatus and radio transmission method that switch between a single-carrier communication method and a multi-carrier communication method.

BACKGROUND ART

In LTE-Advanced, an enhanced version of 3GPP LTE (3rd Generation Partnership Project Long Term Evolution), hybrid transmission, in which switching is performed between SC-FDMA (Single Carrier-Frequency Division Multiple Access) and OFDMA (Orthogonal Frequency Division Multiple Access) in an uplink, has been investigated (see Non-Patent Literature 1, for example).

An advantage of OFDMA is that more flexible frequency resource allocation is possible than in the case of SC-FDMA, and therefore frequency scheduling gain is obtained. Thus, OFDMA enables improved throughput performance. On the other hand, an advantage of SC-FDMA is that PAPR (Peak-to-Average Power Ratio) indicating a ratio of peak to average power of a transmission signal, and CM (Cubic Metric), are smaller than in the case of OFDMA. Consequently, if power amplifiers with the same maximum transmission power specification are used for SC-FDMA and OFDMA, power amplifier back-off necessary for transmitting a transmission signal without distortion can be made smaller in the case of SC-FDMA. Thus, SC-FDMA can increase actually transmissible maximum power, enabling improved coverage performance.

Hybrid transmission enables the respective above advantages to be obtained by switching adaptively between SC-FDMA and OFDMA according to the communication environment of a mobile station.

Investigation has been carried out into having control of switching between SC-FDMA and OFDMA performed by a base station based on power headroom (hereinafter referred to as "PHR") information indicating a margin of power (possible increase in power) of the transmission power of a mobile station. Non-Patent Literature 1 describes applying OFDMA to a mobile station with a PHR margin because transmission power is low, and applying SC-FDMA to a mobile station with no PHR margin because transmission power is high.

The PHR definition and transmitting method investigated in LTE will now be described. With LTE, a mobile station transmits PHR by means of a data channel in order for PHR to be used when a base station performs transmission power control, MCS (Modulation and channel Coding Scheme) control, and transmission bandwidth control. Non-Patent Literature 2 includes a PHR definition and PHR transmission conditions according to equation 1.

[1]

$$PHR = 10\log_{10}(P_{MAX}) - (10\log_{10}M + P_0 + \alpha PL + \Delta_{MCS} + f(\Delta_i))$$ (Equation 1)

Here, PHR indicates power headroom [dB], $P_{MAX}$ indicates maximum transmission power [mW], M indicates an allocated number of frequency resource blocks, $P_0$ indicates an offset (a parameter signaled from a base station) [dB], PL indicates a path loss level [dB], α indicates a weighting coefficient for path loss, $\Delta_{MCS}$ indicates an MCS-dependent offset, and $f(\Delta_i)$ indicates a transmission power control value subject to closed loop control.

When a mobile station moves, path loss occurs, and therefore PHR fluctuates temporally. Consequently, it is necessary for a mobile station to report PHR to a base station at a predetermined period and when a predetermined condition is satisfied. Non-Patent Literature 2 discloses reporting of PHR to a base station by a mobile station if PHR is less than Y [dB] or if path loss changes by X [dB], and also describes reporting of PHR at N-frame intervals (where Y, X, and N are parameters).

Non-Patent Literature 3 describes PHR being transmitted as data MAC (Medium Access Control) information by means of a data channel (in LTE, a PUSCH (Physical Uplink Shared Channel)).

FIG. 1 shows the relationship between PHR and throughput performance. In FIG. 1, the solid line indicates an OFDMA characteristic, and the dotted line indicates an SC-FDMA characteristic. As shown in FIG. 1, when there is a PHR margin (PHR is large), OFDMA provides better throughput performance than SC-FDMA due to such advantages as a frequency scheduling effect. On the other hand, when there is no PHR margin (PHR is small), OFDMA throughput performance and SC-FDMA throughput performance are reversed, and SC-FDMA throughput performance is better.

The reason for the degradation of OFDMA throughput performance is that, when PHR becomes small, CM and PAPR power amplifier back-off becomes necessary, and a mobile station cannot transmit data at a transmission power level specified by a base station. On the other hand, with SC-FDMA, the CM and PAPR are smaller than with OFDMA, and back-off necessary for a power amplifier is also smaller, and therefore a mobile station can transmit data at a transmission power level specified by a base station, and degradation of throughput performance can be suppressed. Thus, switching between OFDMA and SC-FDMA at PHR at which throughput performances coincide is ideal.

Also, with LTE-Advanced, applying precoding in an uplink (here, meaning stream multiplexing prior to transmission power amplification) has been investigated. Below, application of precoding is referred to as "precoding ON", and non-application of precoding is referred to as "precoding OFF".

An advantage of performing directional transmission with precoding ON is that the reception SINR can be improved. However, with OFDMA, the CM of a transmission signal is quite large to begin with, and therefore there is hardly any variation in the CM between precoding ON and precoding OFF, whereas with OFDMA, a difference in the CM arises between precoding ON and precoding OFF.

FIG. 2 shows the results of a computer simulation carried out by the present inventors. As can be seen from FIG. 2, with OFDMA there is hardly any difference in the CM between precoding ON and precoding OFF, whereas with SC-FDMA there is a difference of 1.3 dB in the CM between precoding OFF and precoding ON. Consequently, with SC-FDMA, actually transmissible maximum power can be increased, enabling improved coverage performance. Thus, with SC-FDMA, it is possible to conceive of a base station controlling precoding ON/OFF switching based on PHR information.

FIG. 3 shows the relationship between PHR and throughput performance in SC-FDMA. In FIG. 3, the solid line indicates a precoding ON characteristic, and the dotted line indicates a precoding OFF characteristic. As shown in FIG. 3, when there is a PHR margin (PHR is large), throughput performance is better with precoding ON than with precoding OFF due to such advantages as an improvement in the SINR through directional transmission. On the other hand, when there is no PHR margin (PHR is small), precoding ON throughput performance and precoding OFF throughput performance are reversed, and precoding OFF throughput performance is better.

The reason for the degradation of precoding ON throughput performance is that, when PHR becomes small, CM and PAPR power amplifier back-off becomes necessary, and a mobile station cannot transmit data at a transmission power level specified by a base station. On the other hand, with precoding OFF, the CM and PAPR are smaller than with precoding ON, and back-off necessary for a power amplifier is also smaller, and therefore a mobile station can transmit data at a transmission power level specified by a base station, and degradation of throughput performance can be suppressed. Thus, switching between precoding ON and OFF in SC-FDMA at PHR at which throughput performances coincide is ideal.

Also, with LTE-Advanced, switching between single-carrier transmission and multi-carrier transmission in an uplink using a DFT-s-OFDM-with-SDC method has been investigated (see Non-Patent Literature 4, for example).

FIG. 4 is a block diagram showing a general configuration of a DFT-s-OFDM-with-SDC-type transmitting apparatus. As shown in FIG. 4, this transmitting apparatus performs DFT (Discrete Fourier Transform) processing on a data signal, and maps a post-DFT data signal to the frequency domain. A mapped data signal undergoes IFFT (Inverse Fast Fourier Transform) processing and CP (Cyclic Prefix) addition, and is then transmitted. Having the subcarrier mapping section shown in FIG. 4 control the data signal frequency-domain mapping method enables switching between single-carrier transmission and multi-carrier transmission. Specifically, if the number of frequency-domain data divisions (hereinafter referred to as SDs (Spectrum Divisions)) is 1, single-carrier transmission is used, and if the number of SDs$\geq$2, multi-carrier transmission is used. By controlling the number of SDs according to the communication environment of a mobile station, a base station can switch adaptively between single-carrier transmission and multi-carrier transmission.

An advantage of a DFT-s-OFDM-with-SDC method is that frequency scheduling gain can be obtained by increasing the degree of freedom of transmission data frequency allocation by increasing the number of SDs. However, as the number of SDs is increased, the CM also increases.

FIG. 5 shows the results of a computer simulation carried out by the present inventors to evaluate the relationship between the number of SDs and the CM for a DFT-s-OFDM-with-SDC method. As can be seen from FIG. 5, the CM increases as the number of SDs increases. Consequently, a smaller number of SDs enables actually transmissible maximum power to be increased, enabling improved coverage performance. Thus, with a DFT-s-OFDM-with-SDC method, it is possible to conceive of a base station controlling switching between a larger and smaller number of SDs based on PHR information.

FIG. 6 shows the relationship between PHR and throughput performance for a DFT-s-OFDM-with-SDC method. In FIG. 6, the solid line indicates a characteristic for a larger number of SDs (for example, number of SDs$\geq$3), and the dotted line indicates a characteristic for a smaller number of SDs (for example, number of SDs<3). As shown in FIG. 6, when there is a PHR margin (PHR is large), throughput performance is better with a larger number of SDs than with a smaller number of SDs due to such advantages as an improvement in frequency scheduling gain through an improvement in the degree of freedom of transmission data allocation. On the other hand, when there is no PHR margin (PHR is small), throughput performance with a larger number of SDs and throughput performance with a smaller number of SDs are reversed, and throughput performance with a smaller number of SDs is better.

The reason for the degradation of throughput performance with a larger number of SDs is that, when PHR becomes small, CM and PAPR power amplifier back-off becomes necessary, and a mobile station cannot transmit data at a transmission power level specified by a base station. On the other hand, with a smaller number of SDs, the CM and PAPR are smaller than with a larger number of SDs, and back-off necessary for a power amplifier is also smaller, and therefore a mobile station can transmit data at a transmission power level specified by a base station, and degradation of throughput performance can be suppressed. Thus, performing switching between a larger and smaller number of SDs at PHR at which throughput performances coincide is ideal.

CITATION LIST

Non-Patent Literature

[NPL 1] Panasonic, REV-080007, "Technical proposals and considerations for LTE advanced" 3GPP TSG RAN IMT Advanced Workshop, Shenzhen, China, Apr. 7-8, 2008
[NPL 2] Nokia Siemens Networks, Nokia, R1-081464, "Triggers for Power Headroom Reports in EUTRAN Uplink" 3GPP TSG RAN WG1 Meeting #52bis, Shenzhen, China, 31 Mar.-4 Apr., 2008
[NPL 3] Ericsson, Nokia Corporation, Nokia Siemens Networks, NTT DoCoMo, Qualcomm Europe, Samsung, R2-074682, "Uplink Scheduling Information in E-UTRAN" 3GPP TSG-RAN WG2 Meeting #60, Jeju, South Korea, 5-9 Nov. 2007
[NPL 4] NEC, R1-081752, "Proposals on PHY related aspects in LTE Advanced" 3GPP TSG RAN1#53, Kansas City, Mo., USA, 5-9 May, 2008

SUMMARY OF INVENTION

Technical Problem

However, a problem with the above-described method of switching between SC-FDMA and OFDMA is that, if a base station cannot always ascertain a change of PHR of a mobile station, and PHR ascertained by the base station differs from the actual mobile station PHR, base station switching control is delayed. Specifically, if switching from OFDMA to SC-FDMA is delayed, the power level at which the mobile station can transmit becomes lower than the transmission power level specified by the base station, the reception SNR of the base station decreases, and reception errors become prone to occur.

Similarly, with the above-described precoding ON/OFF switching method in SC-FDMA, if switching from precoding ON to precoding OFF is delayed, the power level at which a mobile station can transmit becomes lower than the transmission power level specified by a base station, the reception SNR of the base station decreases, and reception errors become prone to occur.

Similarly, with the above-described method of switching between a larger and smaller number of SDs, if switching from a larger number of SDs to a smaller number of SDs is delayed, the power level at which a mobile station can transmit becomes lower than the transmission power level specified by a base station, the reception SNR of the base station decreases, and reception errors become prone to occur.

If the frequency of PHR reporting is increased in order to reduce the control delay in switching between SC-FDMA and OFDMA, precoding ON/OFF switching, and switching between a larger and smaller number of SDs, overhead due to PHR transmission increases, and data throughput decreases.

It is therefore an object of the present invention to provide a radio transmission apparatus and radio transmission method that suppress a decrease in throughput due to switching of the communication method while suppressing an increase in the amount of signaling.

Solution to Problem

A radio transmitting apparatus of the present invention transmits a signal using one of a plurality of different communication methods, and employs a configuration having: a calculation section that calculates power headroom of the apparatus; a setting section that sets, for each communication method, a threshold value used to determine whether or not to transmit the calculated power headroom; and a transmitting section that transmits the power headroom if the power headroom falls below the threshold value.

A radio transmitting method of the present invention transmits a signal using one of a plurality of different communication methods, and includes: calculating power headroom of a radio transmitting apparatus; setting, for each communication method, a threshold value used to determine whether or not to transmit the calculated power headroom; and transmitting the power headroom if the power headroom falls below the threshold value.

Advantageous Effects of Invention

The present invention suppresses a decrease in throughput due to switching of the communication method while suppressing an increase in the amount of signaling.

BRIEF DESCRIPTION OF DRAWINGS

FIG. 14 is a drawing showing examples of PMI;

DESCRIPTION OF EMBODIMENTS

Now, embodiments of the present invention will be described in detail with reference to the accompanying drawings. In the embodiments, configuration elements that have identical functions are assigned the same reference codes, and duplicate descriptions are omitted.

Embodiment 1

Figure 7:
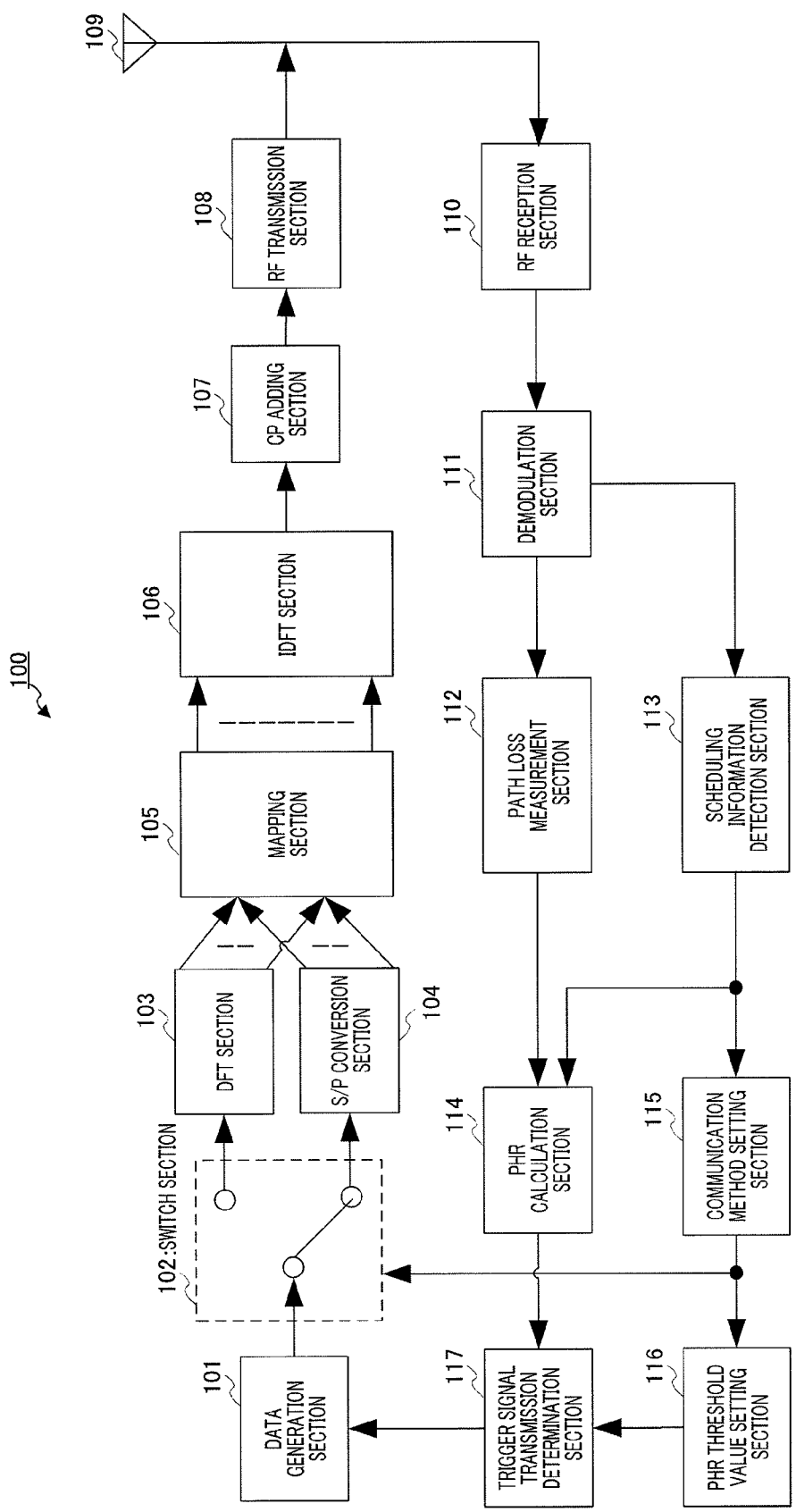
FIG. 7 is a block diagram showing the configuration of a mobile station according to Embodiment 1 of the present invention.

FIG. 7 is a block diagram showing the configuration of mobile station 100 according to Embodiment 1 of the present invention. The configuration of mobile station 100 is described below using FIG. 7.

Data generation section 101 generates data that is transmitted by mobile station 100, and outputs the generated data to switch section 102. Also, if a switching trigger signal prompting switching of the communication method between SC-FDMA and OFDMA is output from trigger signal transmission determination section 117 described later herein, data generation section 101 includes the switching trigger signal in data MAC information, and outputs the MAC information to switch section 102.

Switch section 102 switches between outputting data output from data generation section 101 to DFT (Discrete Fourier Transform) section 103, and outputting this data to S/P (serial/parallel) conversion section 104, in accordance with a command from communication method setting section 115 described later herein. Specifically, switch section 102 outputs data to DFT section 103 if there is an SC-FDMA command from communication method setting section 115, and outputs data to S/P conversion section 104 if there is an OFDMA command from communication method setting section 115.

DFT section 103 executes DFT processing on data output from switch section 102, and outputs the data to mapping section 105. Meanwhile, S/P conversion section 104 converts data output from switch section 102 from a serial sequence to a parallel sequence, and outputs this to mapping section 105.

Mapping section 105 maps data output from DFT section 103 or data output from S/P conversion section 104 onto a scheduled frequency band, and outputs the data to IDFT (Inverse Discrete Fourier Transform) section 106. That is to say, each data symbol of data output from DFT section 103 is mapped onto an entire transmission frequency band, while each data symbol output from S/P conversion section 104 is mapped onto an individual subcarrier.

IDFT section 106 executes IDFT processing on a frequency-domain signal output from mapping section 105, performs conversion to a time-domain signal, and outputs this to CP (Cyclic Prefix) adding section 107.

CP adding section 107 copies part of the frame end of a signal output from IDFT section 106, and adds a CP to the signal frame start. A signal to which a CP has been added is output to RF transmission section 108.

RF transmission section 108 executes transmission processing such as D/A conversion, amplification, and up-conversion on a signal output from CP adding section 107, and transmits the signal to the base station from antenna 109.

RF reception section 110 receives a signal transmitted from a base station via antenna 109, executes reception processing such as down-conversion and A/D conversion, and outputs the signal to demodulation section 111.

Demodulation section 111 performs equalization processing and demodulation processing on a signal output from RF reception section 110, and outputs the demodulation result to path loss measurement section 112 and scheduling information detection section 113.

Path loss measurement section 112 measures the reception level of a downlink common pilot signal for which transmission power is known in a signal output from demodulation section 111, and measures a path loss level for the channel based on the measured reception level. The measured path loss level is output to PHR calculation section 114.

Scheduling information detection section 113 detects an MCS specified by the base station, scheduling information such as a transmission bandwidth and transmission power control information, and information indicating the data channel communication method, in a signal output from demodulation section 111, and outputs the detected scheduling information and information indicating the data channel communication method to PHR calculation section 114 and communication method setting section 115.

PHR calculation section 114 finds a data channel transmission power level based on the path loss level output from path loss measurement section 112 and scheduling information and information indicating the data channel communication method output from scheduling information detection section 113, and calculates PHR as shown in equation 1. The calculated PHR is output to trigger signal transmission determination section 117.

Communication method setting section 115 sets information indicating the data channel communication method— that is, SC-FDMA or OFDMA—in a signal output from scheduling information detection section 113 in switch section 102 and PHR threshold value setting section 116.

PHR threshold value setting section 116 decides a PHR threshold value according to the communication method set by communication method setting section 115, and outputs the decided PHR threshold value to trigger signal transmission determination section 117.

Trigger signal transmission determination section 117 performs a relative size comparison between the PHR output from PHR calculation section 114 and the PHR threshold value output from PHR threshold value setting section 116— that is, performs a threshold value determination—and generates a switching trigger signal prompting switching of the communication method (a PHR or switching request flag) based on the determination result. The generated switching trigger signal is output to data generation section 101. Details of the switching trigger signal transmission determination method will be given later herein.

Figure 8:
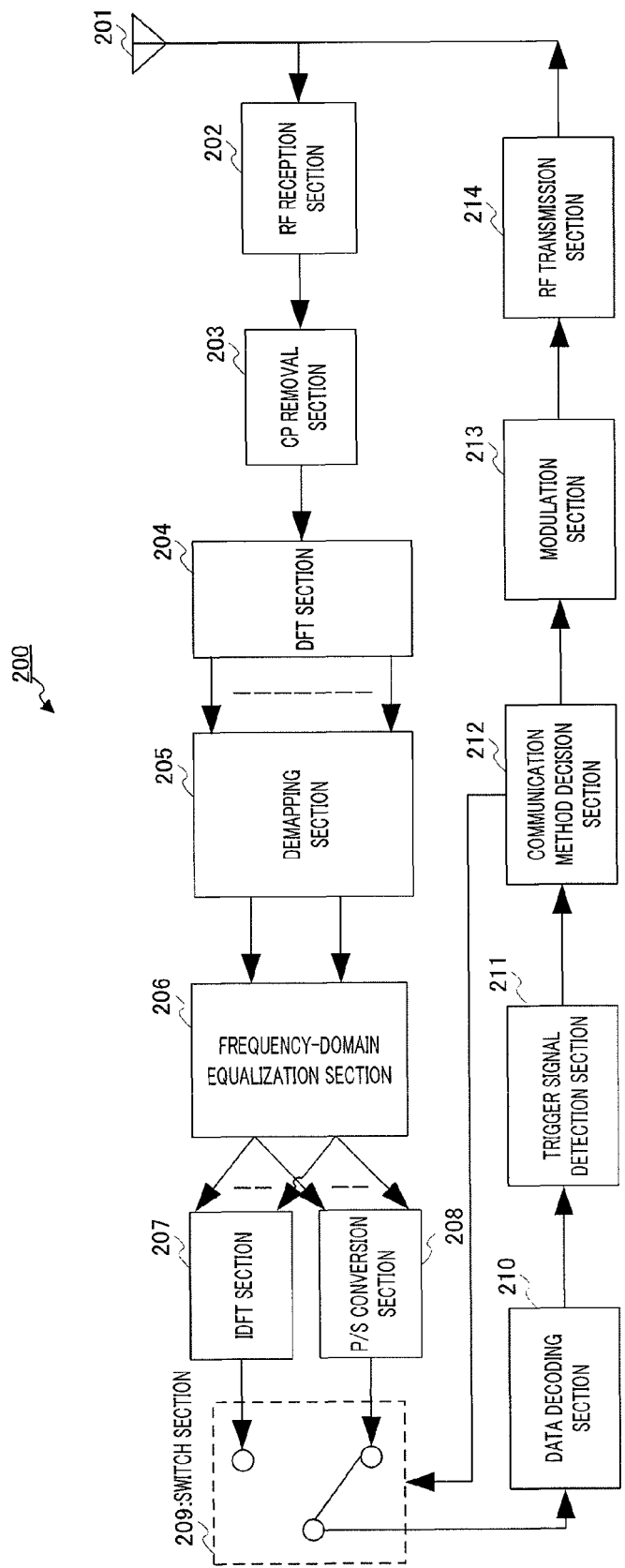
FIG. 8 is a block diagram showing the configuration of a base station according to Embodiment 1 of the present invention.

FIG. 8 is a block diagram showing the configuration of base station 200 according to Embodiment 1 of the present invention. The configuration of base station 200 is described below using FIG. 8.

RF reception section 202 receives a signal transmitted from mobile station 100 via antenna 201, executes reception processing such as down-conversion and A/D conversion on the received signal, and outputs the signal to CP removal section 203.

CP removal section 203 removes a CP from a signal output from RF reception section 202, and outputs a signal from which the CP has been removed to DFT section 204.

DFT section 204 executes DFT processing on a signal output from CP removal section 203, and outputs a signal that has been transformed from the time domain to the frequency domain to demapping section 205.

Demapping section 205 extracts received data from a frequency band scheduled by base station 200 in a frequency-domain signal output from DFT section 204, and outputs this data to frequency-domain equalization section 206.

Using a channel estimation value found from a pilot signal, frequency-domain equalization section 206 performs equalization processing that corrects frequency-domain amplitude and phase fluctuation suffered on the channel by received data output from demapping section 205, and outputs received data after equalization processing to IDFT section 207 and P/S conversion section 208.

IDFT section 207 executes IDFT processing on received data output from frequency-domain equalization section 206, performs conversion to a time-domain signal, and outputs this to control section 209.

P/S conversion section 208 converts received data output from frequency-domain equalization section 206 from a parallel sequence to a serial sequence, and outputs this to switch section 209.

Switch section 209 outputs data output from IDFT section 207 to data decoding section 210 if the communication method output from communication method decision section 212 described later herein is SC-FDMA, or outputs data output from P/S conversion section 208 to data decoding section 210 if the communication method output from communication method decision section 212 is OFDMA.

Data decoding section 210 decodes data output from switch section 209, and outputs the decoded data to trigger signal detection section 211.

Trigger signal detection section 211 detects a switching trigger signal included in data output from data decoding section 210, and outputs the detected switching trigger signal to communication method decision section 212.

Communication method decision section 212 decides switching of the data channel communication method by means of which mobile station 100 will transmit next time, based on the switching trigger signal output from trigger signal detection section 211, and outputs switching command information to modulation section 213. Specifically, if the switching trigger signal is a signal requesting switching of the communication method, communication method decision section 212 switches the communication method. That is to say, if the current communication method is SC-FDMA, the data channel by means of which mobile station 100 will transmit next time uses OFDMA, and if the current communication method is OFDMA, the data channel by means of which mobile station 100 will transmit next time uses SC-FDMA. If the switching trigger signal output from trigger signal detection section 211 is not a signal requesting switching of the communication method, the current communication method is decided upon as the data channel communication method by means of which mobile station 100 will transmit next time.

Modulation section 213 modulates switching command information output from communication method decision section 212, and outputs a modulated signal to RF transmission section 214.

RF transmission section 214 executes transmission processing such as D/A conversion, amplification, and up-conversion on a modulated signal output from modulation section 213, and transmits the signal to mobile station 100 from antenna 201.

A communication procedure between mobile station 100 shown in FIG. 7 and base station 200 shown in FIG. 8 will now be described using FIG. 9.

Figure 9:
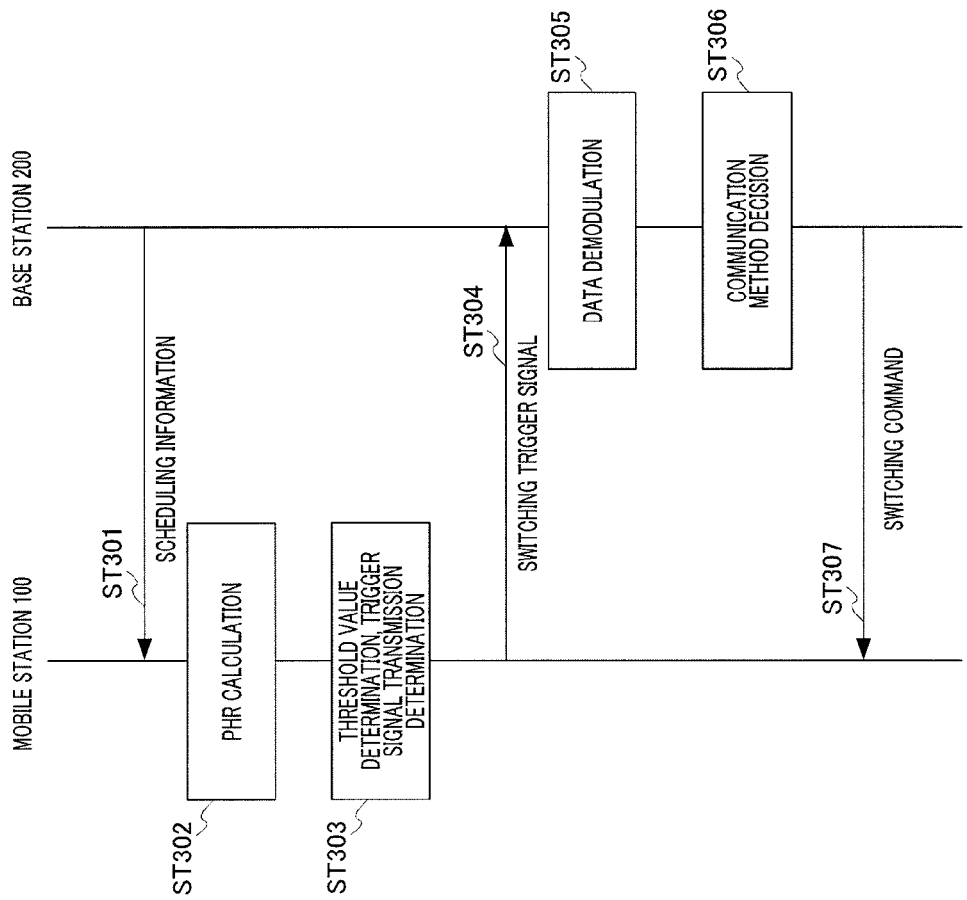
FIG. 9 is a sequence diagram showing a communication procedure between the mobile station shown in FIG. 7 and the base station shown in FIG. 8.

In FIG. 9, in step (hereinafter abbreviated to "ST") 301, base station 200 transmits uplink data channel scheduling information (the MCS, transmission bandwidth, transmission power control information, and so forth) to mobile station 100.

In ST302, mobile station 100 calculates PHR based on a power ratio between a transmission power level decided by means of scheduling information specified by base station 200 and the maximum transmission power level of mobile station 100, and in ST303, determines whether or not it is necessary to switch the communication method of the data channel specified by base station 200 based on the calculated PHR (trigger signal transmission determination). Specifically, whether or not the communication method needs to be switched is decided by performing a relative size comparison between a threshold value set beforehand according to the current data channel communication method and the calculated PHR (a threshold value determination). Details of the threshold value setting method will be given later herein.

If switching of the communication method is determined to be necessary in ST303, then, in ST304, mobile station 100 includes a switching trigger signal (PHR or switching request flag) in data MAC information, and transmits this to base station 200 using a data channel, and, in ST305, base station 200 demodulates data transmitted from mobile station 100 and acquires the switching trigger signal.

In ST306, base station 200 decides the next data channel communication method based on the switching trigger signal and the PHR of mobile station 100, and, in ST307, transmits a command to switch to the decided communication method to mobile station 100.

The PHR threshold value setting method and trigger signal transmission determination method will now be described.

Figure 10:
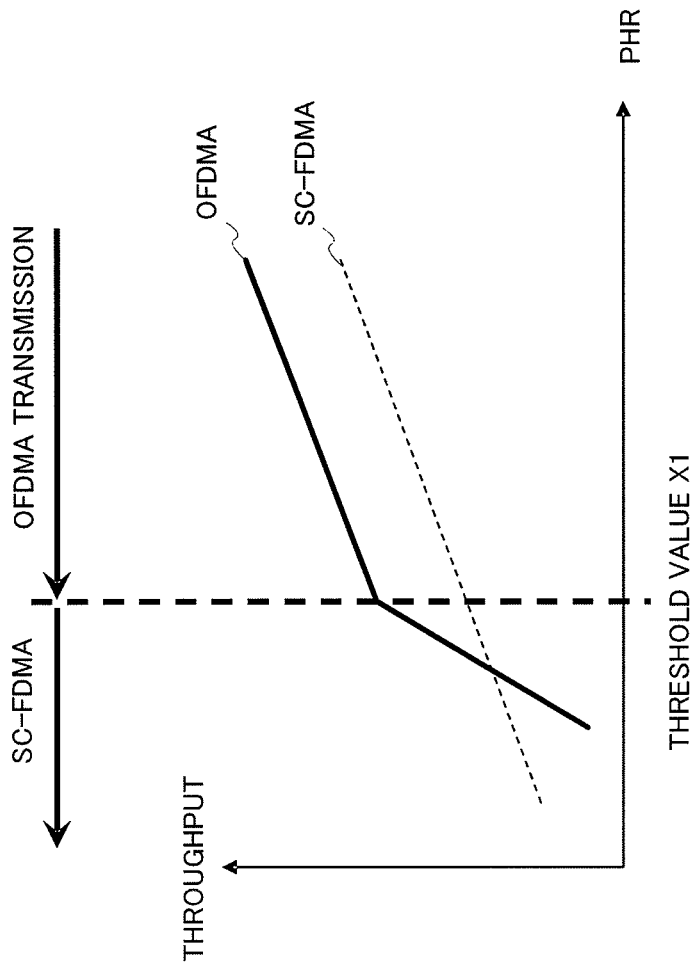
FIG. 10 is a drawing showing a threshold value used to determine to switch from OFDMA to SC-FDMA.

First, as shown in FIG. 10, PHR threshold value setting section 116 sets threshold value X1 at a position at which PHR is greater than PHR at which SC-FDMA throughput performance and OFDMA throughput performance coincide. This threshold value X1 is used to determine to switch from OFDMA to SC-FDMA. Specifically, PHR threshold value setting section 116 sets threshold value X1 at a position greater by a predetermined value than PHR at which SC-FDMA throughput performance and OFDMA throughput performance coincide.

If the communication method set by communication method setting section 115 is OFDMA, PHR threshold value setting section 116 sets X1 in trigger signal transmission determination section 117 as a threshold value. If the relationship between PHR from PHR calculation section 114 and threshold value X1 satisfies equation 2 below, trigger signal transmission determination section 117 decides upon transmission of a switching trigger signal for switching from OFDMA to SC-FDMA.

$$PHR \leq X1 \qquad \text{(Equation 2)}$$

By setting threshold value X1 beforehand at a position greater by a predetermined value than PHR at which SC-FDMA throughput performance and OFDMA throughput performance coincide, and transmitting a switching trigger signal for switching from OFDMA to SC-FDMA in this way, degradation of throughput performance due to delay in control of switching from OFDMA to SC-FDMA can be reduced. Also, since a switching trigger signal is transmitted only if PHR satisfies equation 2, the amount of signaling can be suppressed.

In FIG. 10, threshold value X1 is set at a breakpoint at which OFDMA throughput performance degrades sharply, but threshold value X1 need not necessarily be set at this point. By setting threshold value X1 at a position greater than a position at which SC-FDMA throughput performance and OFDMA throughput performance coincide (a throughput performance breakpoint), performance degradation can be reduced even if there is switching control delay and PHR deviates from that assumed by the base station.

It is desirable for threshold value X1 to be set between a throughput performance cross-point and breakpoint. By setting an upper limit for threshold value X1, an increase in overhead due to PHR reporting can be prevented. Also, within such a PHR range, the gradient of OFDMA throughput performance increases and the difference between OFDMA throughput performance and SC-FDMA throughput performance decreases, and therefore the amount of decrease in throughput performance can be kept small even if switching from OFDMA to SC-FDMA is performed early.

Also, threshold value X1 may be decided according to an assumed temporal variation rate of a mobile station's PHR. For example, a smaller threshold value X1 may be set for a mobile station for which temporal variation is assumed to be small because its speed of movement is low. Conversely, a larger threshold value X1 may be set for a mobile station for which temporal variation is assumed to be large because its speed of movement is high. By this means, each mobile station can obtain the advantages of OFDMA to the full, and can prevent performance degradation due to delay in switching to SC-FDMA.

Figure 11:
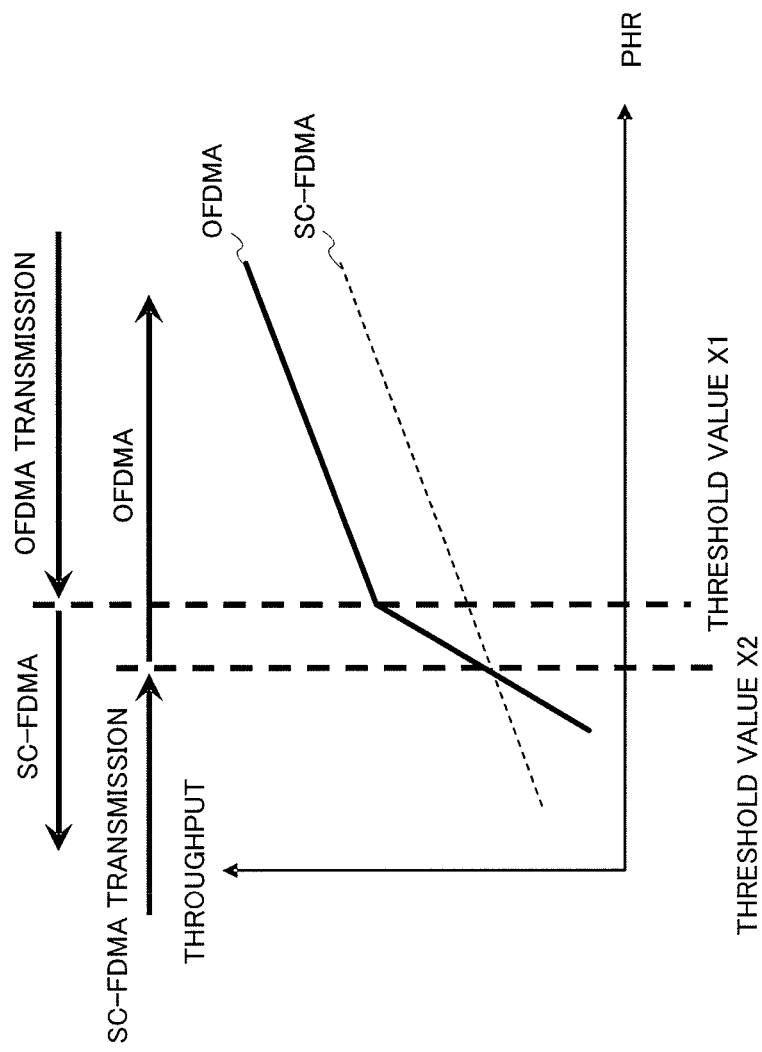
FIG. 11 is a drawing showing a threshold value used to determine to switch from SC-FDMA to OFDMA.

Next, in addition to above-described threshold value X1 used for switching from OFDMA to SC-FDMA, PHR threshold value setting section 116 sets threshold value X2 used for switching from SC-FDMA to OFDMA, as shown in FIG. 11. Specifically, threshold value X2 (where $X2 \leq X1$) is set at a position at which SC-FDMA throughput performance and OFDMA throughput performance coincide.

If the communication method set by communication method setting section 115 is SC-FDMA, PHR threshold value setting section 116 sets X2 in trigger signal transmission determination section 117 as a threshold value. If the relationship between threshold value X2 and PHR from PHR calculation section 114 satisfies equation 3 below, trigger signal transmission determination section 117 decides upon transmission of a switching trigger signal for switching from SC-FDMA to OFDMA.

$$PHR \geq X2 \qquad \text{(Equation 3)}$$

By setting threshold value X2 beforehand at a position at which SC-FDMA throughput performance and OFDMA throughput performance coincide, and transmitting a switching trigger signal for switching from SC-FDMA to OFDMA in this way, switching from SC-FDMA to OFDMA can be performed fast, and OFDMA's advantage, that is, frequency scheduling gain, can be obtained to a greater extent. Also, since a switching trigger signal is transmitted only if PHR satisfies equation 3, the amount of signaling can be suppressed.

If a relational expression between X1 and X2 is defined beforehand as shown in equation 4, the amount of threshold value signaling from a base station to a mobile station can be reduced. Here, α is a coefficient known to the base station and mobile station.

$$X1 = X2 + \alpha \quad \text{(Equation 4)}$$

Since PHR at the throughput performance breakpoint depends on the transmission signal CM [dB], α can be defined based on the CMs of an SC-FDMA signal and OFDMA signal. For example, in the case of QPSK, the SC-FDMA signal CM is 1.2 dB and the OFDMA signal CM is 4.0 dB, and, from the difference between the two, α can be defined as 2.8 dB.

Thus, it is only necessary for either threshold value X1 or threshold value X2 to be reported to a mobile station from a base station, enabling a reduced amount of signaling. From one threshold value and α decided by the system beforehand, a mobile station can derive the other threshold value.

Also, α shown in equation 4 may be linked to the rate of variation of a mobile station's PHR, or a mobile station's MCS. Specifically, the higher the rate of variation of a mobile station's PHR, the larger is the value of α that is set, and the lower the rate of variation of a mobile station's PHR, the smaller is the value of a that is set. Furthermore, since the gradient of throughput performance with respect to PHR varies according to the MCS, a larger value is set for a in the case of an MCS for which the gradient is steep (such as an MCS with a low coding rate), and a smaller value is set for a in the case of an MCS for which the gradient is gentle. By this means, if threshold value X2 is decided beforehand, threshold value X1 can be set according to the circumstances of each mobile station.

Within a predetermined time only after the communication method has been switched, PHR threshold value setting section 116 can reduce the frequency of switching trigger signal transmission by performing hysteresis control such that the threshold value is not switched. That is to say, within predetermined time (predetermined frame) T1 after switching from OFDMA to SC-FDMA, transmission is by SC-FDMA transmission, but threshold value X1 used to determine to switch from OFDMA to SC-FDMA is used to determine to switch to OFDMA;

and, within predetermined time T2 (where T2≦T1) after switching from SC-FDMA to OFDMA, transmission is by OFDMA transmission, but threshold value X2 used to determine to switch from SC-FDMA to OFDMA, is used to determine to switch to SC-FDMA.

By this means, frequent switching trigger signal generation can be prevented, enabling the amount of signaling to be suppressed, even when PHR is positioned between threshold values X1 and X2.

By setting hysteresis time T2 after switching to OFDMA smaller than T1, delay in switching from OFDMA to SC-FDMA can be further reduced.

Thus, according to Embodiment 1, by setting threshold value X1 beforehand at a position greater by a predetermined value than PHR at which SC-FDMA throughput performance and OFDMA throughput performance coincide, and having a mobile station transmit a switching trigger signal for switching from OFDMA to SC-FDMA when PHR in an OFDMA communication method falls below threshold value X1, switching control delay in switching from OFDMA to SC-FDMA can be reduced, and degradation of throughput performance due to delay can be avoided.

Embodiment 2

In Embodiment 1, a case was described in which a switching trigger signal is transmitted included in data as data channel MAC information. In Embodiment 2 of the present invention, a case will be described in which a switching trigger signal for switching to SC-FDMA is transmitted by means of a dedicated control channel only at the time of OFDMA transmission.

Figure 12:
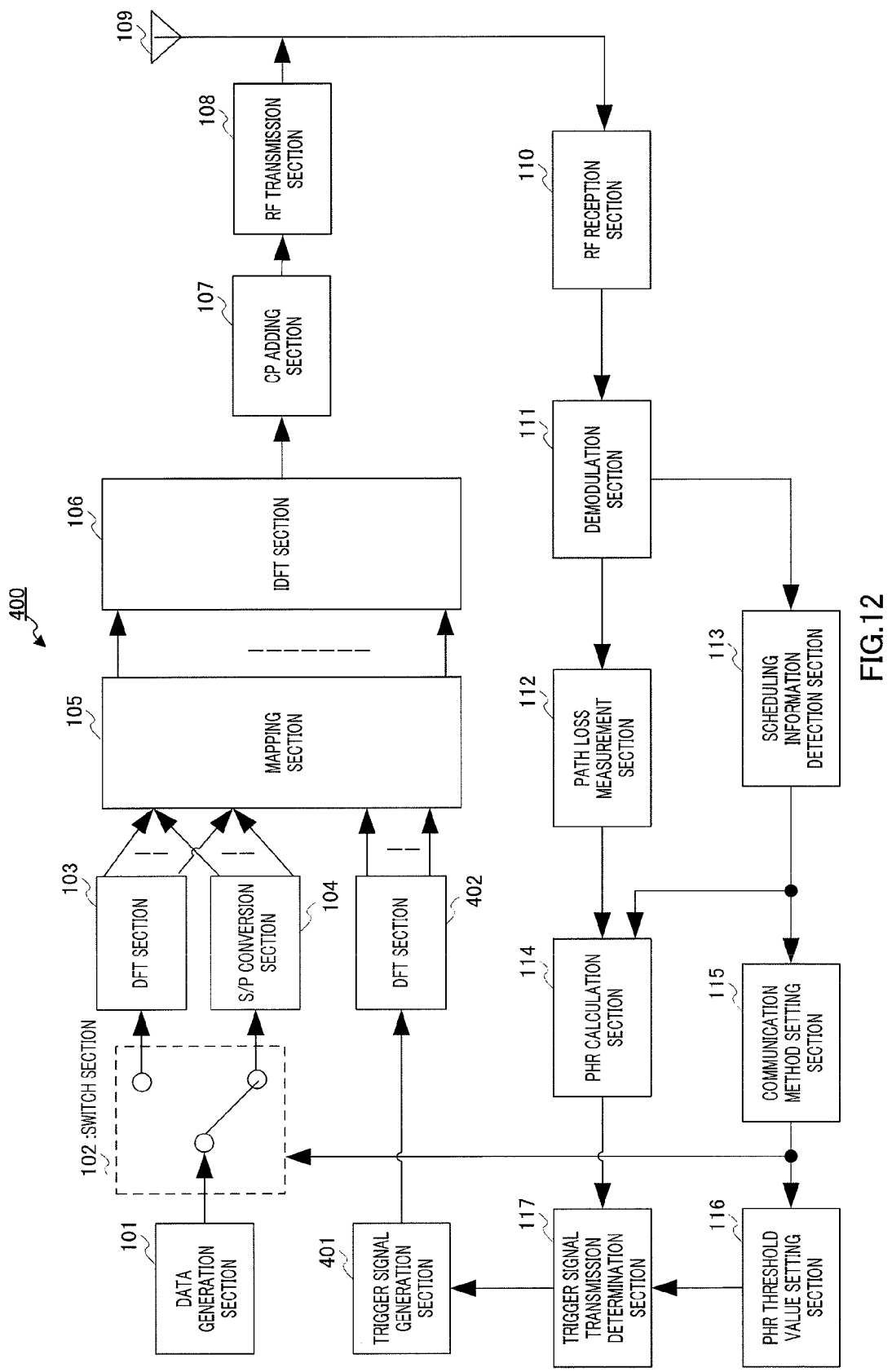
FIG. 12 is a block diagram showing the configuration of a mobile station according to Embodiment 2 of the present invention.

FIG. 12 is a block diagram showing the configuration of mobile station 400 according to Embodiment 2 of the present invention. The configuration of mobile station 400 is described below using FIG. 12. FIG. 12 differs from FIG. 7 in that trigger signal generation section 401 and DFT section 402 have been added.

Trigger signal generation section 401 generates a switching trigger signal for switching from OFDMA to SC-FDMA based on a signal output from trigger signal transmission determination section 117, and outputs the generated switching trigger signal to DFT section 402. A switching trigger signal generated by trigger signal generation section 401 may be 1-bit information indicating whether or not a switching request is made, and therefore, for example, trigger signal generation section 401 generates a switching trigger signal by spreading that 1 bit with a predetermined code.

DFT section 402 converts a time-domain switching trigger signal output from trigger signal generation section 401 to the frequency domain by executing DFT processing, and outputs the resulting signal to mapping section 105.

Mapping section 105 maps data output from DFT section 103 or data output from S/P conversion section 104 onto a scheduled frequency band, and outputs the data to IDFT section 106. The mapping section also maps a switching trigger signal output from DFT section 402 onto a control channel transmission resource allocated periodically by a base station, and outputs this to IDFT section 106.

FIG. 12 shows the transmission configuration of a data channel and a control channel that transmits a switching trigger signal, but it is not necessary for these two channels to be transmitted simultaneously, and one of these channels may be transmitted.

The configuration of a control channel for switching trigger signal transmission will now be described. A base station periodically allocates control channel transmission resources (time, frequency, code, and so forth) for transmitting a switching trigger signal to a mobile station that performs OFDMA transmission. A switching trigger signal may be 1-bit information as to whether or not request switching, and therefore necessary transmission resources are smaller than in the case of a data channel. Using the same kind of method as in Embodiment 1, trigger signal transmission determination section 117 decides whether or not a switching trigger signal is transmitted based on a path loss level and data channel scheduling information transmitted the previous time.

Thus, even if there is no data channel allocation to mobile station 400, mobile station 400 can transmit a switching trigger signal for switching from OFDMA to SC-FDMA using a dedicated control channel.

Thus, according to Embodiment 2, even if there is no data channel allocation, by transmitting a switching trigger signal for switching from OFDMA to SC-FDMA using a dedicated control channel, delay in switching from OFDMA to SC-FDMA can be reduced, and performance degradation due to delay can be reduced.

Embodiment 3

In Embodiment 1, a switching trigger signal used for switching between OFDMA and SC-FDMA was described. In Embodiment 3 of the present invention, a trigger signal (PHR information or the like) used for switching between precoding ON and precoding OFF will be described.

Figure 13:
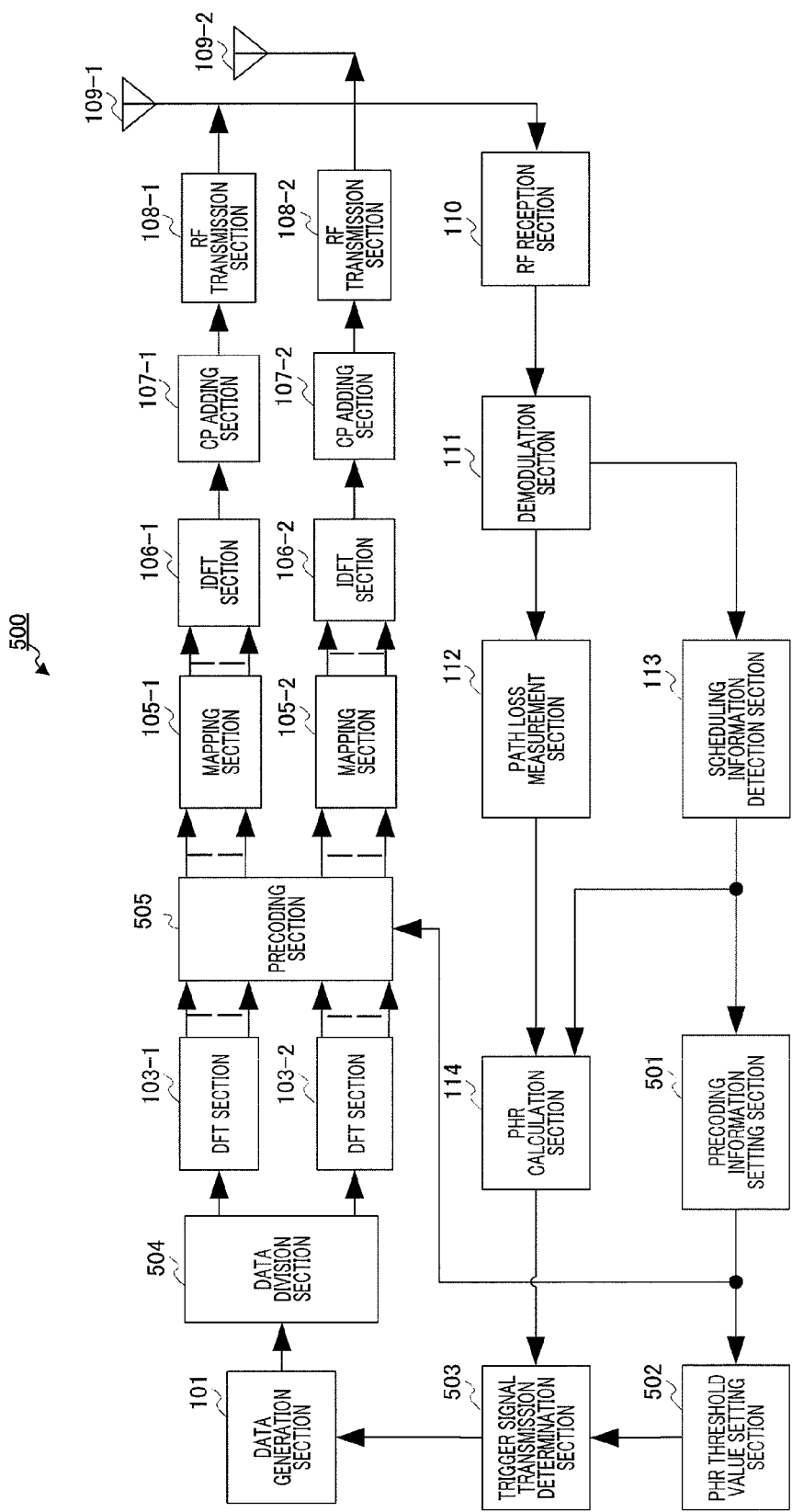
FIG. 13 is a block diagram showing the configuration of a mobile station according to Embodiment 3 of the present invention.

FIG. 13 is a block diagram showing the configuration of mobile station 500 according to Embodiment 3 of the present invention. The configuration of mobile station 500 is described below using FIG. 13. FIG. 13 differs from FIG. 7 in that communication method setting section 115 has been changed to precoding information setting section 501, PHR threshold value setting section 116 to PHR threshold value setting section 502, trigger signal transmission determination section 117 to trigger signal transmission determination section 503, and switch section 102 to data division section 504, and precoding section 505 has been added. Also, S/P conversion section 104 has been eliminated, and DFT section 103, mapping section 105, IDFT section 106, CP adding section 107, RF transmission section 108, and antenna 109 have each been changed to a dual-system configuration.

Precoding information setting section 501 sets precoding matrix information (hereinafter referred to as "PMI") in a signal output from scheduling information detection section 113 in PHR threshold value setting section 502 and precoding section 505. As examples of PMI, matrices for multiplication by precoding section 505 are associated with PMI numbers (PMI #) 1 through 3 respectively beforehand as shown in FIG. 14.

PHR threshold value setting section 502 decides a PHR threshold value according to PMI set by precoding information setting section 501, and outputs the decided PHR threshold value to trigger signal transmission determination section 503.

Trigger signal transmission determination section 503 performs a relative size comparison between the PHR output from PHR calculation section 114 and the PHR threshold value output from PHR threshold value setting section 502—that is, performs a threshold value determination—and generates a switching trigger signal (PHR) prompting precoding ON/OFF switching based on the determination result. The generated switching trigger signal is output to data generation section 101. Details of the switching trigger signal transmission determination method will be given later herein.

Data division section 504 divides data output from data generation section 101 into two streams, outputs one stream to DFT section 103-1, and outputs the other stream to DFT section 103-2.

Precoding section 505 multiplies a matrix corresponding to PMI set by precoding information setting section 501 by the two streams output from DFT sections 103-1 and 103-2, and outputs the resulting signals to mapping sections 105-1 and 105-2. Specifically, if the two stream signals input to precoding section 505 are designated S1 and S2, the multiplication matrix is designated P, and the two stream signals output to IDFT sections 106 are designated S1' and S2', when PMI #1 in FIG. 14 is set, equation 5 applies.

(Equation 5)

$$\begin{bmatrix} S_1' \\ S_2' \end{bmatrix} = P\begin{bmatrix} S_1 \\ S_2 \end{bmatrix} = \frac{1}{\sqrt{2}}\begin{bmatrix} 1 & 0 \\ 0 & 1 \end{bmatrix} \times \begin{bmatrix} S_1 \\ S_2 \end{bmatrix} = \frac{1}{\sqrt{2}}\begin{bmatrix} S_1 \\ S_1 \end{bmatrix} \quad [2]$$

When PMI #2 in FIG. 14 is set, equation 6 applies.

(Equation 6)

$$\begin{bmatrix} S_1' \\ S_2' \end{bmatrix} = P\begin{bmatrix} S_1 \\ S_2 \end{bmatrix} = \frac{1}{\sqrt{2}}\begin{bmatrix} 1 & 1 \\ 1 & -1 \end{bmatrix} \times \begin{bmatrix} S_1 \\ S_2 \end{bmatrix} = \frac{1}{\sqrt{2}}\begin{bmatrix} S_1 + S_2 \\ S_1 - S_2 \end{bmatrix} \quad [3]$$

As can be seen from equation 5, in the case of PMI #1, output signals S1' and S2' are signals in which input signals S1 and S2 are not added. Thus, when PMI #1 is used, stream multiplexing is not performed prior to RF transmission sections 108-1 and 108-2 (transmission power amplification), and therefore precoding OFF is set. Also, as can be seen from equation 6, in the case of PMI #2, output signals S1' and S2' are signals in which input signals S1 and S2 are added. Thus, stream multiplexing is performed prior to RF transmission sections 108-1 and 108-2 (transmission power amplifiers), and therefore precoding ON is set.

Figure 15:
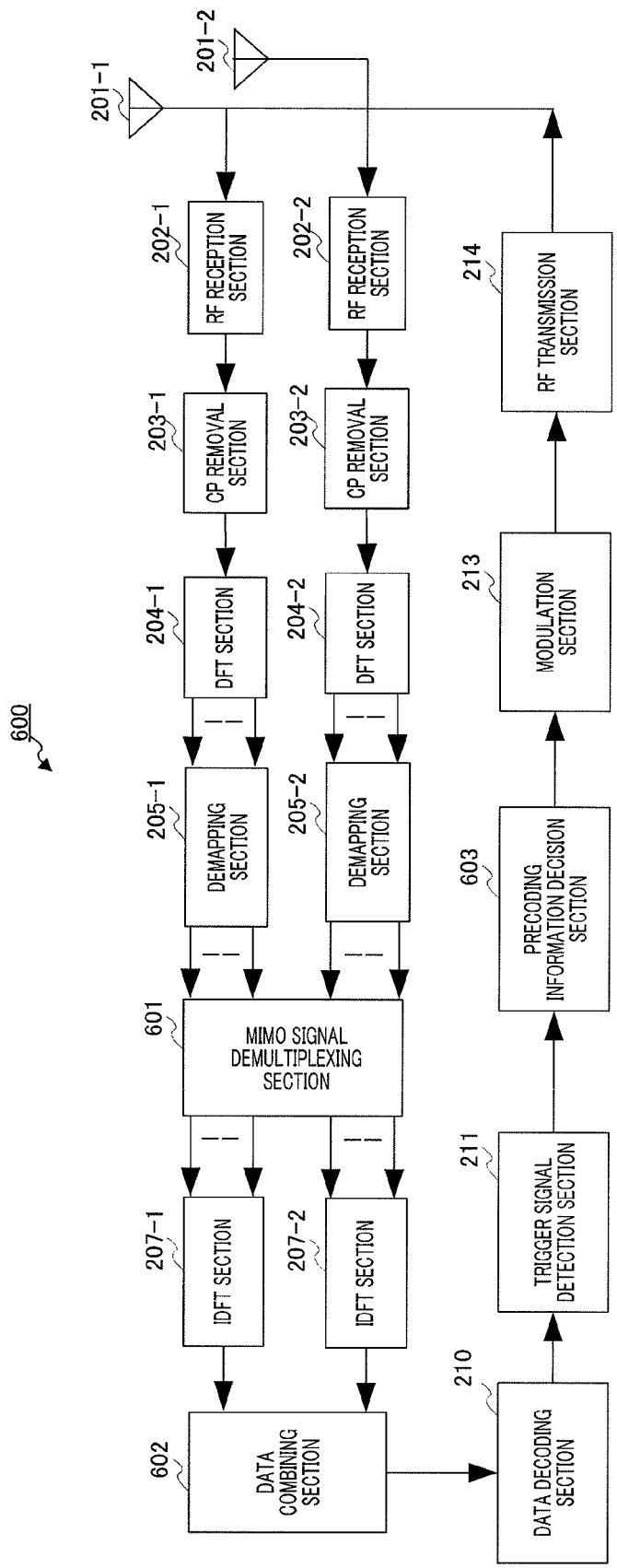
FIG. 15 is a block diagram showing the configuration of a base station according to Embodiment 3 of the present invention.

FIG. 15 is a block diagram showing the configuration of base station 600 according to Embodiment 3 of the present invention. The configuration of base station 600 is described below using FIG. 15. FIG. 15 differs from FIG. 8 in that MIMO signal demultiplexing section 601 and data combining section 602 have been added, and communication method decision section 212 has been changed to precoding information decision section 603. Also, P/S conversion section 208 and switch section 209 have been eliminated, and antenna 201, RF reception section 202, CP removal section 203, DFT section 204, demapping section 205, and IDFT section 207 have each been changed to a dual-system configuration.

MIMO signal demultiplexing section 601 finds a channel estimation value from a received pilot signal via two antennas 201-1 and 202-2, uses the found channel estimation value to demultiplex the signals output from demapping sections 205-1 and 205-2 into two streams, outputs one stream to IDFT section 207-1, and outputs the other stream to IDFT section 207-2.

Data combining section 602 combines the two streams output from IDFT sections 207-1 and 207-2, and outputs the resulting signal to data decoding section 210.

Precoding information decision section 603 decides PMI to be used by mobile station 500 in the next transmission based on a switching trigger signal (PHR) output from trigger signal detection section 211. Specifically, precoding information decision section 603 decides upon precoding OFF for the next mobile station 500 transmission if a switching trigger signal (PHR) is detected, and decides upon precoding ON for the next mobile station 500 transmission if a switching trigger signal (PHR) is not detected.

The PHR threshold value setting method and trigger signal transmission determination method used by mobile station 500 will now be described.

Figure 16:
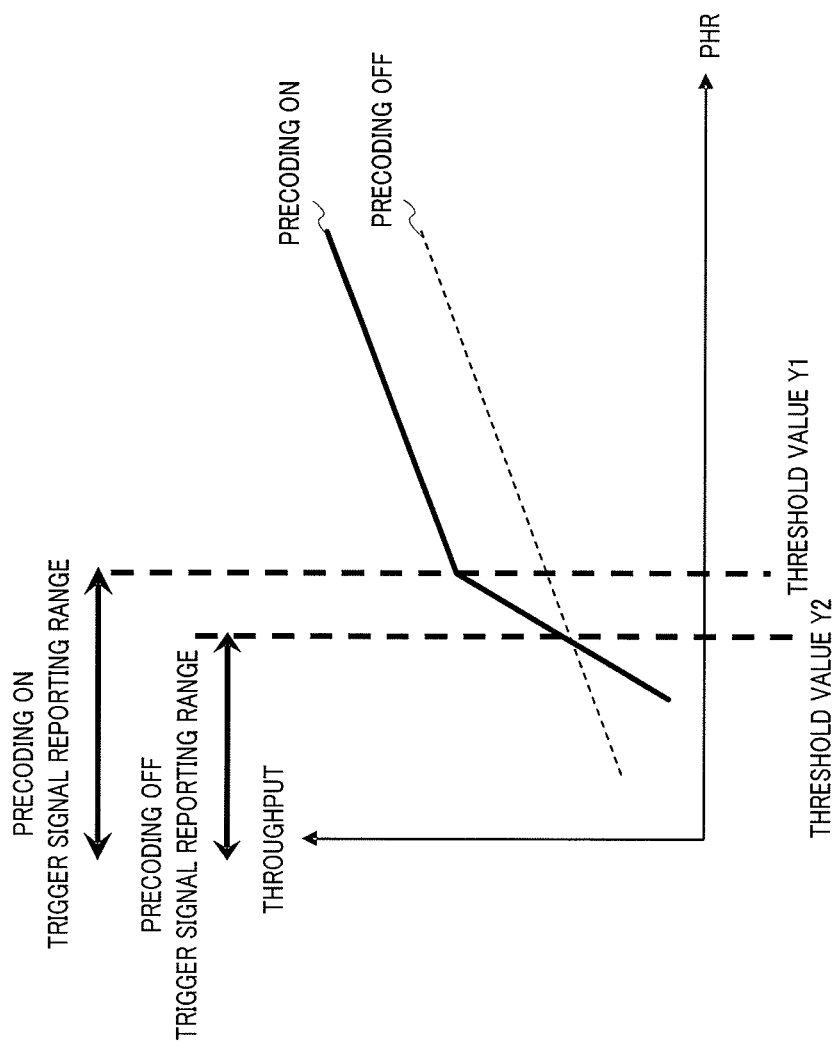
FIG. 16 is a drawing showing threshold values used for determination of precoding ON/OFF switching.

As shown in FIG. 16, PHR threshold value setting section 502 sets threshold values in a similar way to Embodiment 1. Here, SC-FDMA in Embodiment 1 corresponds to precoding OFF, and OFDMA corresponds to precoding ON.

First, threshold value Y1 is set at a position greater than PHR at which precoding ON throughput performance and precoding OFF throughput performance coincide.

If PMI set by precoding information setting section 501 is a precoding ON matrix (in the case of PMI #2 and PMI #3 in FIG. 14), PHR threshold value setting section 502 sets Y1 in trigger signal transmission determination section 503 as a threshold value. If the relationship between PHR from PHR calculation section 114 and threshold value Y1 satisfies equation 7 below, trigger signal transmission determination section 503 decides upon switching trigger signal (PHR) transmission.

$$PHR \leq Y1 \quad \text{(Equation 7)}$$

By setting threshold value Y1 beforehand at a position greater by a predetermined value than PHR at which precoding ON throughput performance and precoding OFF throughput performance coincide, and transmitting PHR in this way, degradation of throughput performance due to delay in control of switching from precoding ON to precoding OFF can be reduced.

Furthermore, threshold value Y2 (where $Y2 \leq Y1$) is set at PHR at which precoding ON throughput performance and precoding OFF throughput performance coincide. This threshold value Y2 is used when precoding OFF is set.

If PMI set by precoding information setting section 501 is a precoding OFF matrix (in the case of PMI #1 in FIG. 14), PHR threshold value setting section 502 sets Y2 in trigger signal transmission determination section 503 as a threshold value. If the relationship between threshold value Y2 and PHR from PHR calculation section 114 satisfies equation 8 below, trigger signal transmission determination section 503 decides upon switching trigger signal (PHR) transmission.

$$PHR \leq Y2 \quad \text{(Equation 8)}$$

By setting threshold value Y2 beforehand at PHR at which precoding ON throughput performance and precoding OFF throughput performance coincide, and transmitting PHR in this way, switching from precoding OFF to precoding ON can be performed fast, and the precoding ON advantage of improved reception SINR can be obtained.

Also, when equation 7 or equation 8 is satisfied, a switching trigger signal (PHR) is always transmitted, and therefore switching delay can be reduced, and more dynamic precoding ON/OFF switching control becomes possible.

Thus, according to Embodiment 3, by setting threshold value Y1 beforehand at a position greater by a predetermined value than PHR at which precoding ON throughput performance and precoding OFF throughput performance coincide, and having a mobile station transmit a switching trigger signal when PHR falls below threshold value Y1 when precoding ON is set and when PHR falls below threshold value Y2 when precoding OFF is set, precoding ON/OFF switching control can be reduced, and degradation of throughput performance due to delay can be avoided.

When OFDMA transmission is used, there is hardly any variation in the CM between precoding ON and precoding OFF, and therefore it is not necessary to change the PHR threshold value for precoding ON and precoding OFF, as in Embodiment 3. As shown in Embodiment 3, an effect is obtained by use with precoding ON/OFF in SC-FDMA for which the CM is low to begin with.

Figure 1:
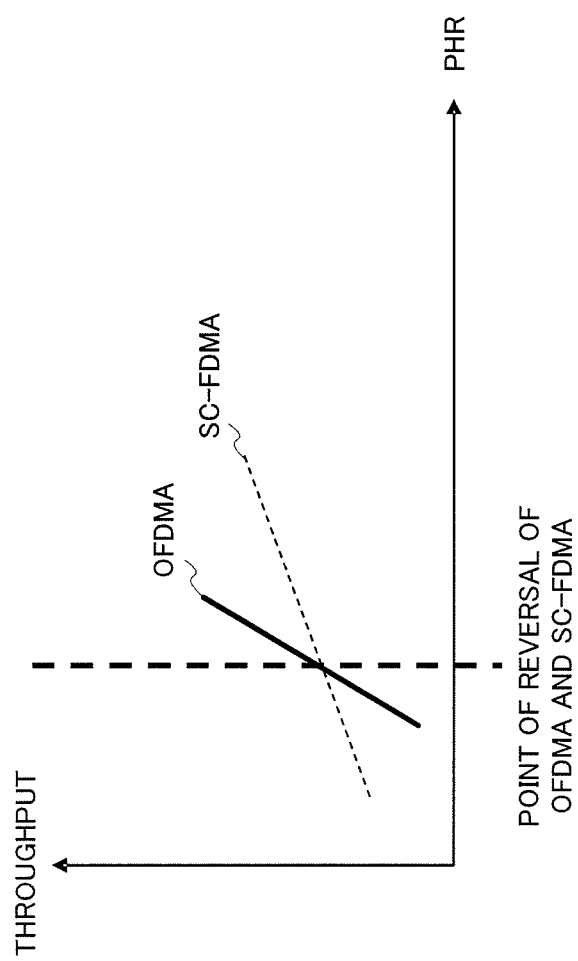
FIG. 1 is a drawing showing the relationship between PHR and throughput performance.
Figure 2:
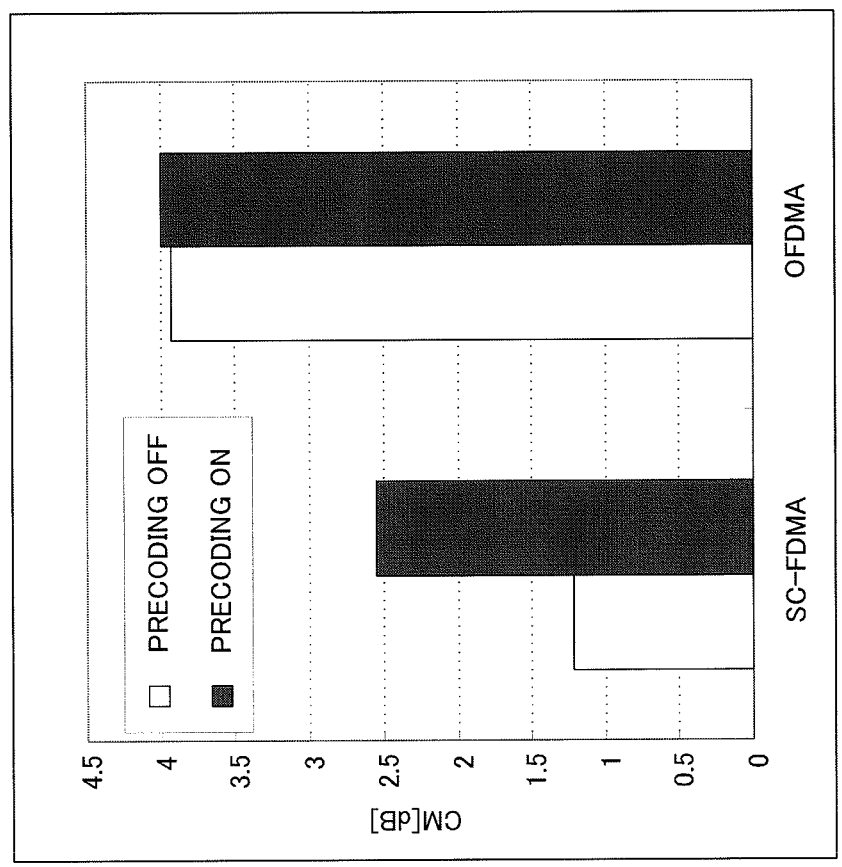
FIG. 2 is a drawing showing CM values with precoding ON and precoding OFF respectively in SC-FDMA and OFDMA.
Figure 3:
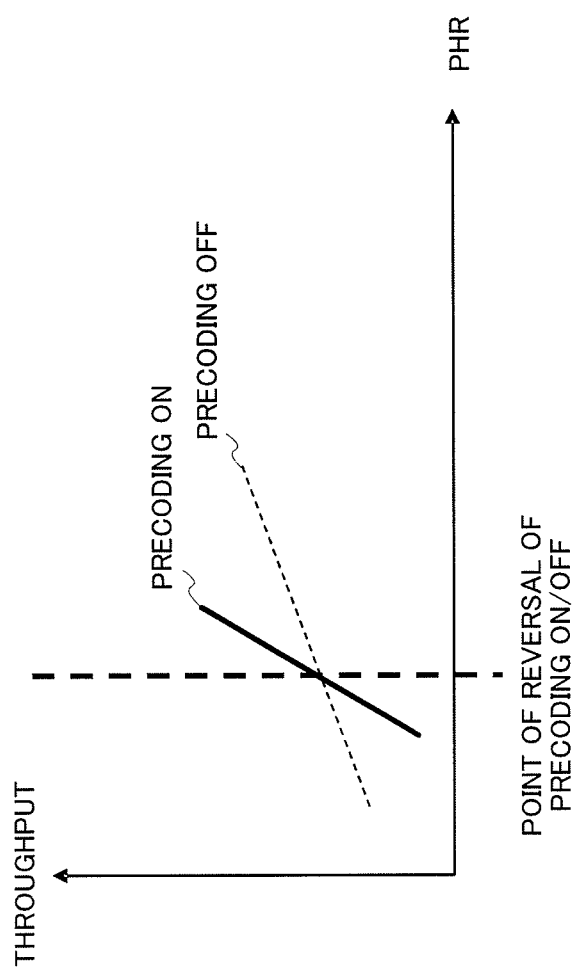
FIG. 3 is a drawing showing the relationship between PHR and throughput performance in SC-FDMA.
Figure 4:
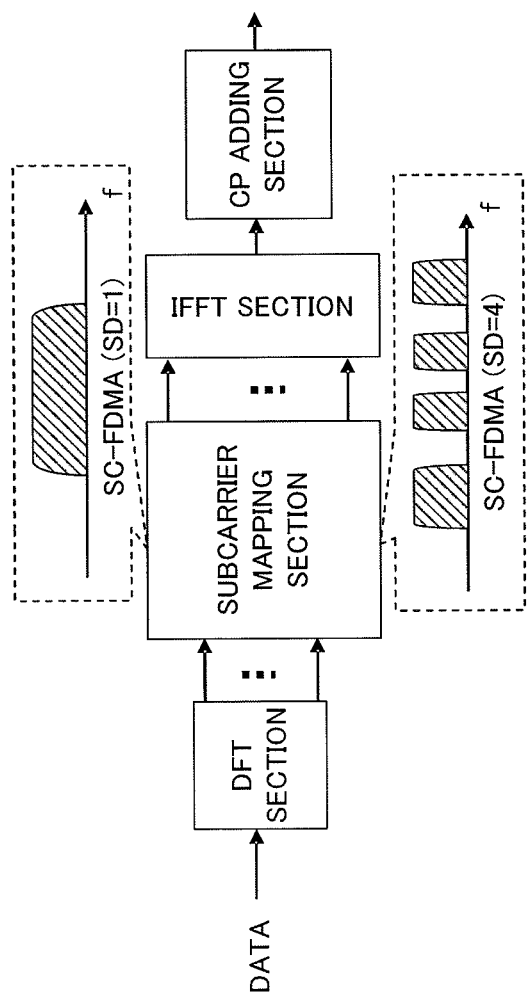
FIG. 4 is a block diagram showing a general configuration of a DFT-s-OFDM-with-SDC-type transmitting apparatus.

As in Embodiment 1, if a relational expression between Y1 and Y2 is defined beforehand as shown in equation 4, the amount of threshold value signaling from a base station to a mobile station can be reduced. Here, α can be defined based on the CMs of precoding ON and precoding OFF cases. Referring to FIG. 2, the SC-FDMA precoding OFF CM is 1.2 dB and the precoding ON CM is 2.5 dB, and, from the difference between the two, a can be defined as 1.3 dB.

Embodiment 4

In Embodiment 1, a trigger signal used for switching between OFDMA and SC-FDMA was described. In Embodiment 4 of the present invention, a trigger signal used for switching between a larger and smaller number of SDs with a DFT-s-OFDM-with-SDC method will be described.

Figure 17:
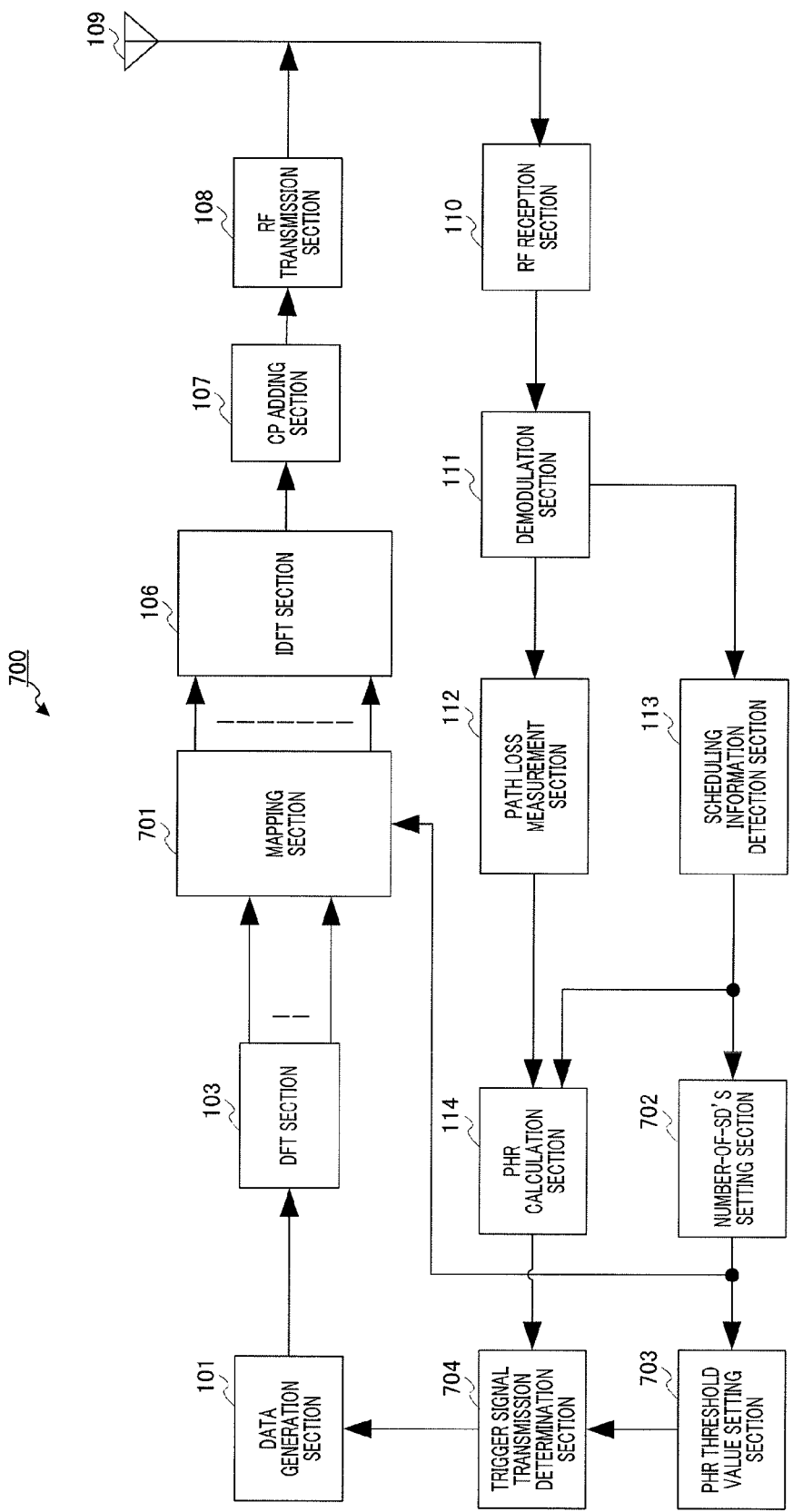
FIG. 17 is a block diagram showing the configuration of a mobile station according to Embodiment 4 of the present invention.

FIG. 17 is a block diagram showing the configuration of mobile station 700 according to Embodiment 4 of the present invention. The configuration of mobile station 700 is described below using FIG. 17. FIG. 17 differs from FIG. 7 in that mapping section 105 has been changed to mapping section 701, PHR threshold value setting section 116 to PHR threshold value setting section 703, and trigger signal transmission determination section 117 to trigger signal transmission determination section 704, and number-of-SDs setting section 702 has been added. Also, switch section 102 and S/P conversion section 104 have been eliminated.

Mapping section 701 maps data output from DFT section 103 to the frequency domain in accordance with the number of SDs (number of divisions of transmission data in the frequency domain (number of consecutive bands)) set by number-of-SDs setting section 702 described later herein, and outputs the data to IDFT section 106.

Number-of-SDs setting section 702 sets number-of-SDs information in the signal output from scheduling information detection section 113 in mapping section 701 and PHR threshold value setting section 703.

PHR threshold value setting section 703 decides a PHR threshold value according to the number of SDs set by number-of-SDs setting section 702, and outputs the decided PHR threshold value to trigger signal transmission determination section 704.

Trigger signal transmission determination section 704 performs a relative size comparison between the PHR output from PHR calculation section 114 and the PHR threshold value output from PHR threshold value setting section 703—that is, performs a threshold value determination—and generates a switching trigger signal (PHR) prompting switching between a larger and smaller number of SDs based on the determination result. The generated switching trigger signal is output to data generation section 101. Details of the switching trigger signal transmission determination method will be given later herein.

Figure 18:
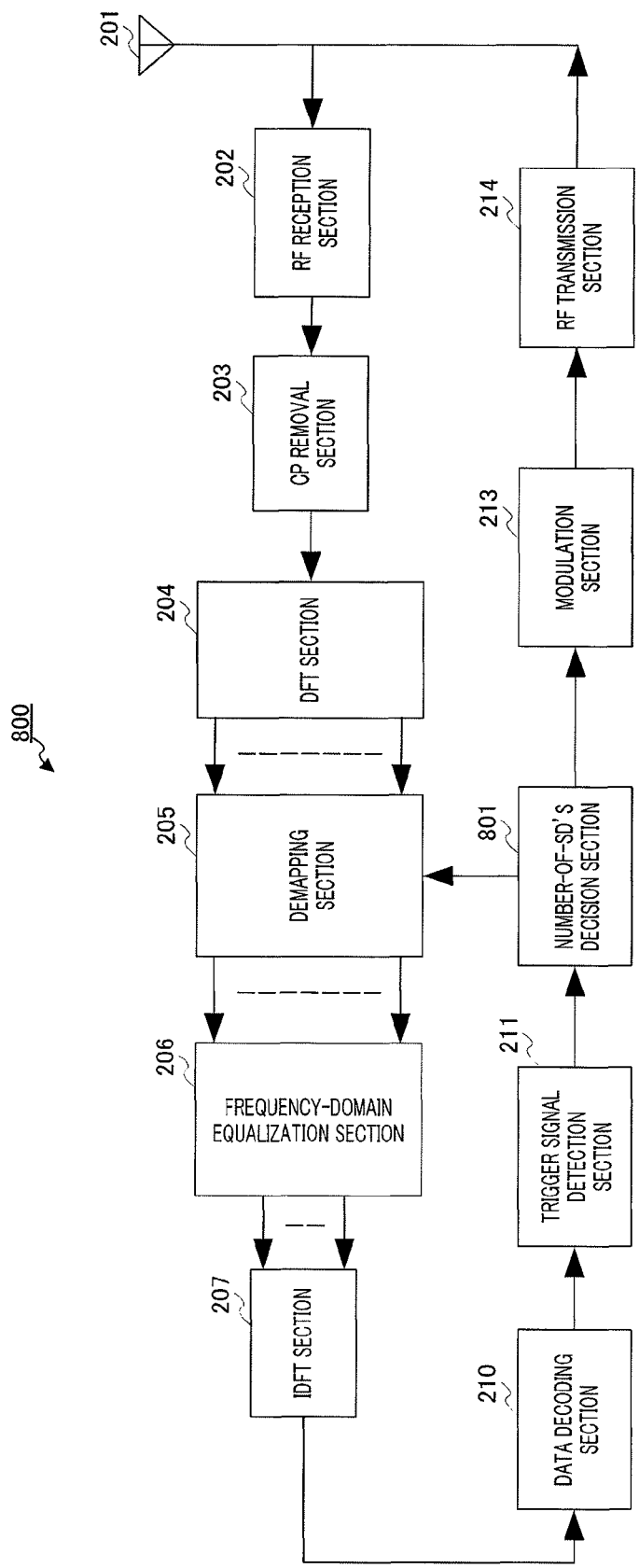
FIG. 18 is a block diagram showing the configuration of a base station according to Embodiment 4 of the present invention.

FIG. 18 is a block diagram showing the configuration of base station 800 according to Embodiment 4 of the present invention. The configuration of base station 800 is described below using FIG. 18. FIG. 18 differs from FIG. 8 in that communication method decision section 212 has been changed to number-of-SDs decision section 801, and P/S conversion section 208 and switch section 209 have been eliminated.

Number-of-SDs decision section 801 decides the number of SDs to be used in the next transmission by mobile station 700 based on a switching trigger signal output from trigger signal detection section 211. Specifically, if PHR is detected as a switching trigger signal, number-of-SDs decision section 801 decides upon a number of SDs for which the greatest frequency scheduling gain is estimated to be obtained within a range of a smaller number of SDs (for example, number of SDs<3) for the next transmission by mobile station 700, and if PHR is not detected, number-of-SDs decision section 801 decides upon a number of SDs for which the greatest frequency scheduling gain is estimated to be obtained within a range of a larger number of SDs (for example, number of SDs$\geq$3) for the next transmission by mobile station 700.

The PHR threshold value setting method and trigger signal transmission determination method used by mobile station 700 will now be described.

Figure 19:
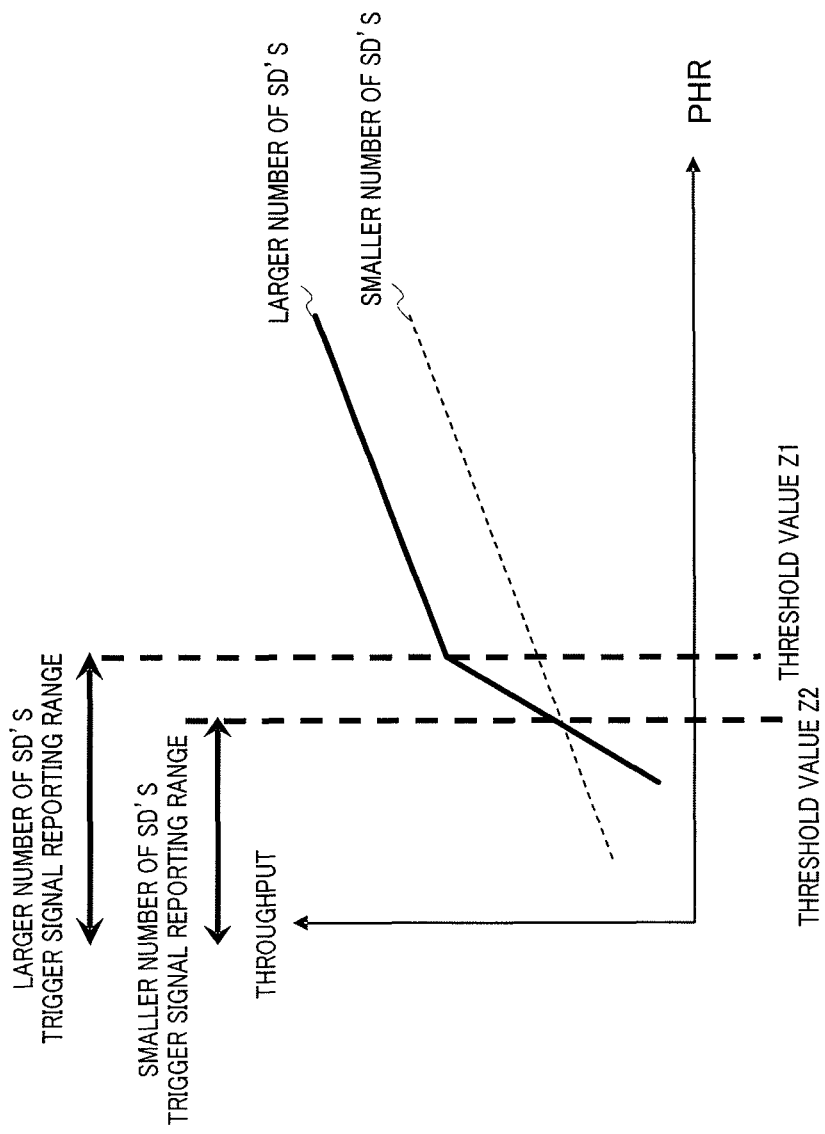
FIG. 19 is a drawing showing threshold values used for determination of switching between a larger and smaller number of SDs.

As shown in FIG. 19, PHR threshold value setting section 703 sets threshold values in a similar way to Embodiment 1.

Here, SC-FDMA in Embodiment 1 corresponds to a smaller number of SDs, and OFDMA corresponds to a larger number of SDs.

Threshold value Z1 is set at a position at which PHR is greater than PHR at which throughput performance for a larger number of SDs and throughput performance for a smaller number of SDs coincide. This threshold value Z1 is used in the case of a larger number of SDs.

If the number of SDs set by number-of-SDs setting section 702 is in a large range (for example, number of SDs≧3), PHR threshold value setting section 703 sets Z1 in trigger signal transmission determination section 704 as a threshold value. If the relationship between PHR from PHR calculation section 114 and threshold value Z1 satisfies equation 9 below, trigger signal transmission determination section 704 decides upon switching trigger signal (PHR) transmission.

$$PHR \leq Z1 \quad \text{(Equation 9)}$$

By setting threshold value Z1 beforehand at a position greater by a predetermined value than PHR at which throughput performance for a larger number of SDs and throughput performance for a smaller number of SDs coincide, and transmitting PHR in this way, degradation of throughput performance due to delay in control of switching from a larger number of SDs to a smaller number of SDs can be reduced.

Furthermore, threshold value Z2 (where $Z2 \leq Z1$) is set at PHR at which throughput performance for a larger number of SDs and throughput performance for a smaller number of SDs coincide. This threshold value Z2 is used in the case of a smaller number of SDs.

If the number of SDs set by number-of-SDs setting section 702 is in a small range (for example, number of SDs<3), PHR threshold value setting section 703 sets Z2 in trigger signal transmission determination section 704 as a threshold value.

If the relationship between threshold value Z2 and PHR from PHR calculation section 114 satisfies equation 10 below, trigger signal transmission determination section 704 decides upon switching trigger signal (PHR) transmission.

$$PHR \leq Z2 \quad \text{(Equation 10)}$$

By setting threshold value Z2 beforehand at PHR at which throughput performance for a larger number of SDs and throughput performance for a smaller number of SDs coincide, and transmitting PHR in this way, a frequency scheduling effect can be obtained to a greater extent through an improvement in the degree of freedom of frequency allocation that is an advantage of a larger number of SDs.

Thus, according to Embodiment 4, by setting threshold value Z1 beforehand at a position greater by a predetermined value than PHR at which throughput performance for a larger number of SDs and throughput performance for a smaller number of SDs coincide, and having a mobile station transmit a switching trigger signal when PHR falls below threshold value Z1 in the case of a larger number of SDs and when PHR falls below threshold value Z2 in the case of a smaller number of SDs, switching control for switching between a larger and smaller number of SDs can be reduced, and degradation of throughput performance due to delay can be avoided.

When OFDMA transmission is used, there is hardly any variation in the CM for a larger number of SDs and a smaller number of SDs, and therefore it is not necessary to change the PHR threshold value for a larger number of SDs and a smaller number of SDs, as in Embodiment 4. As shown in Embodiment 4, an effect is obtained by use for control of the number of SDs in SC-FDMA for which the CM is low to begin with.

In the mobile stations of above Embodiments 3 and 4, a switching trigger signal (PHR) reporting period may also be set. Specifically, if PHR satisfies equation 7 or equation 8, and a predetermined reporting period has passed since the previous switching trigger signal report, a switching trigger signal is transmitted. By this means, switching trigger signal reporting overhead can be reduced. Also, if PHR is between threshold value Z1 and threshold value Z2, switching delay can be reduced by further shortening the PHR reporting period.

Figure 5:
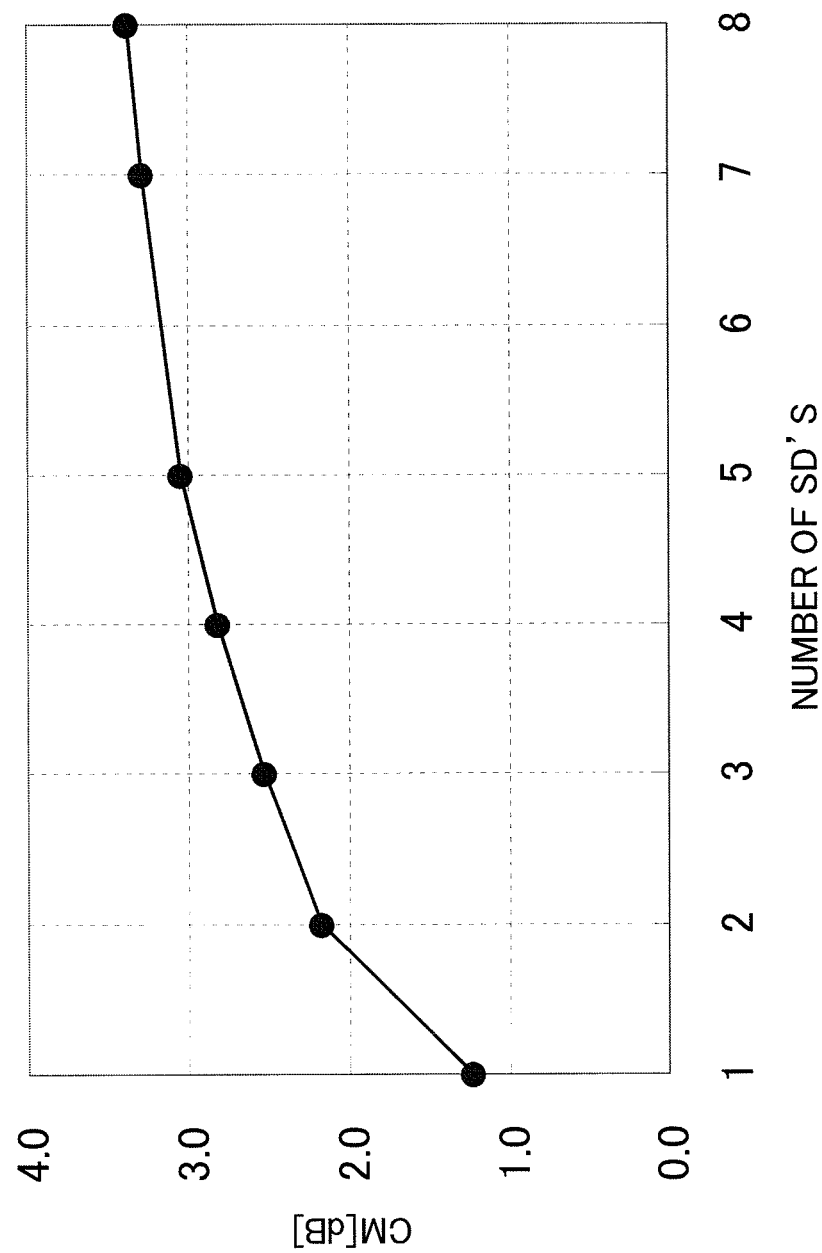
FIG. 5 is a drawing showing the relationship between the number of SDs and the CM for a DFT-s-OFDM-with-SDC method.
Figure 6:
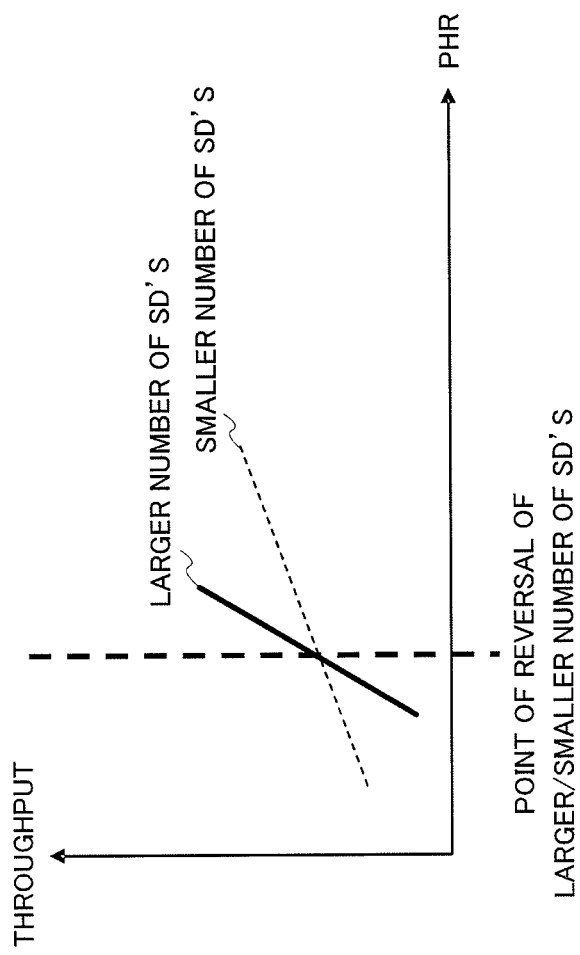
FIG. 6 is a drawing showing the relationship between PHR and throughput performance for a DFT-s-OFDM-with-SDC method.

In a similar way to Embodiment 1, if a relational expression between Z1 and Z2 is defined beforehand as shown in equation 4, the amount of threshold value signaling from a base station to a mobile station can be reduced. Here, α can be defined based on the CMs of a larger number of SDs and a smaller number of SDs. Referring to FIG. 5, the average CM in the case of a smaller number of SDs (for example, number of SDs<3) is 1.7 dB and the average CM in the case of a larger number of SDs (for example, number of SDs≧3) is 3.0 dB, and, from the difference between the two, α can be defined as 1.3 dB.

In above Embodiments 3 and 4, provision may also be made for a switching trigger signal (PHR) to be transmitted only when PHR passes a threshold value, in the same way as in Embodiments 1 and 2. By this means, overhead due to switching trigger signal reporting can be reduced.

In above Embodiments 1 and 2, provision may also be made for a switching trigger signal (PHR) to be constantly transmitted in the same way as in Embodiments 3 and 4. By this means, switching delay can be reduced when it is wished to switch the communication method more dynamically.

In the above embodiments, SC-FDMA has been referred to, but the present invention is not limited to this, and any single-carrier communication method may be used. Also, in the above embodiments, OFDMA has been referred to, but the present invention is not limited to this, and any multi-carrier communication method may be used. A multi-carrier signal also includes a signal in which a plurality of single-carrier signals are multiplexed in the frequency domain, and can be treated in the same way as an OFDMA signal in the above embodiments.

In the above embodiments, a mobile station that switches between SC-FDMA and OFDMA has been described, but the present invention is not limited to this, and can be applied to any communication system in which switching is performed between two communication systems having different levels of CM and PAPR based on PHR. That is to say, the above embodiments exemplify cases in which a communication method with a small CM and PAPR is treated as SC-FDMA, and a communication method with a large CM and PAPR is treated as OFDMA. As other communication methods, for example, a communication method with a small CM and PAPR may be treated as SC-FDMA, and a communication method with a large CM and PAPR as CDMA, or a communication method with a small CM and PAPR may be treated as CDMA, and a communication method with a large CM and PAPR as OFDMA.

In the above embodiments, the descriptions have assumed that switching between SC-FDMA and OFDMA is decided by a base station, but the present invention is not limited to this, and provision may also be made for switching to be decided by a mobile station. In this case, a mobile station should transmit a signal indicating whether or not switching has been performed to a base station, instead of a switching trigger signal requesting switching.

In the above embodiments, cases have been described by way of example in which the present invention is configured as hardware, but it is also possible for the present invention to be implemented by software.

The function blocks used in the descriptions of the above embodiments are typically implemented as LSIs, which are integrated circuits. These may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in, or derivation from, semiconductor technology, integration of the function blocks may of course be performed using that technology. The application of biotechnology or the like is also a possibility.

The disclosures of Japanese Patent Application No. 2008-158017, filed on Jun. 17, 2008, and Japanese Patent Application No. 2008-233710, filed on Sep. 11, 2008, including the specifications, drawings and abstracts, are incorporated herein by reference in their entirety.

INDUSTRIAL APPLICABILITY

A radio transmission apparatus and radio transmission method according to the present invention are suitable for use in a mobile communication system or the like, for example.

The invention claimed is:

1. A radio transmission apparatus that transmits a signal using one of a plurality of different communication methods, said radio transmission apparatus comprising:
a calculator that calculates power headroom of said radio transmission apparatus;
a setter that sets a threshold value depending on a communication method that the radio transmission apparatus uses; and
a transmitter that transmits information indicating the power headroom or requesting a switch between the communication methods based on a comparison between the power headroom and the threshold value,
wherein the communication methods include a first communication method and a second communication method,
the setter sets a first threshold value when the first communication method is used, and sets a second threshold value when the second communication method is used, the second threshold value being lower than the first threshold value, and
the transmitter transmits the information when the power headroom is lower than the set first threshold value and transmits the information when the power headroom is greater than the set second threshold value.

2. The radio transmission apparatus according to claim 1, wherein said setter sets the threshold value larger in proportion as a cubic metric or a peak-to-average power ratio of each communication method is becomes larger.

3. The radio transmission apparatus according to claim 2, wherein the plurality of communication methods comprise a multi-carrier communication method, and a single-carrier communication method for which the cubic metric or the peak-to-average power ratio is smaller than for the multi-carrier communication method.

4. The radio transmission apparatus according to claim 2, wherein the plurality of communication methods comprise the first communication method that performs stream multiplexing, and the second communication method that does not perform stream multiplexing and for which the cubic metric or the peak-to-average power ratio is smaller than for the first communication method.

5. The radio transmission apparatus according to claim 2, wherein the plurality of communication methods comprise the first communication method in which a number of divisions of transmission data in a frequency domain is greater than or equal to a predetermined value, and the second communication method in which a number of divisions of transmission data in the frequency domain is less than a predetermined value and for which the cubic metric or the peak-to-average power ratio is smaller than for the first communication method.

6. The radio transmission apparatus according to claim 1, wherein said transmitter transmits the information, when a reporting period has passed since previous transmission timing of the information, the reporting period being a period for transmitting the information.

7. A radio transmission method that a transmission apparatus utilizes to transmit a signal using one of a plurality of different communication methods, the radio transmission method comprising:
calculating power headroom of the radio transmission apparatus;
setting a threshold value depending on a communication method that the radio transmission apparatus uses; and
transmitting information indicating the power headroom or requesting a switch between the communication methods based on a comparison between the power headroom and the threshold value,
wherein the communication methods include a first communication method and a second communication method,
a first threshold value is set when the first communication method is used, and a second threshold value is set when the second communication method is used, the second threshold value being lower than the first threshold value, and
the information is transmitted when the power headroom is lower than the set first threshold value and the information is transmitted when the power headroom is greater than the set second threshold value.

8. The radio transmission apparatus according to claim 1, wherein the transmitter does not transmit the information when the power headroom is not lower than the set first threshold value and does not transmit the information when the power headroom is not greater than the set second threshold value.

9. The radio transmission apparatus according to claim 1, wherein at least two of the threshold values set depending on the communication methods are different from each other.

10. The radio transmission method according to claim 7, wherein the information is not transmitted when the power headroom is not lower than the set first threshold value and is not transmitted when the power headroom is not greater than the set second threshold value.

11. The radio transmission method according to claim 7, wherein at least two of the threshold values set depending on the communication methods are different from each other.

12. The radio transmission method according to claim 7, wherein the threshold value is set larger in proportion as a cubic metric or a peak-to-average power ratio of each communication method becomes larger, and wherein the plurality of communication methods comprise the first communication method in which a number of divisions of transmission data in a frequency domain is greater than or equal to a predetermined value, and the second communication method in which a number of divisions of transmission data in the frequency domain is less than a predetermined value and for which the cubic metric or the peak-to-average power ratio is smaller than for the first communication method.

13. The radio transmission method according to claim 7, wherein the information is transmitted when a reporting period has passed since previous transmission timing of the information, the reporting period being a period for transmitting the information.

14. The radio transmission apparatus according to claim 1, wherein the radio transmission apparatus is a mobile terminal, and the transmitter transmits the information to a base station.

* * * * *